(12) United States Patent
Makhal et al.

(10) Patent No.: US 12,454,058 B2
(45) Date of Patent: Oct. 28, 2025

(54) METHODS, SYSTEMS, AND COMPUTER PROGRAM PRODUCTS FOR EXECUTING PARTIAL DEPALLETIZATION OPERATIONS IN ROBOTIC DEPALLETIZATION

(71) Applicant: Intelligrated Headquarters, LLC, Mason, OH (US)

(72) Inventors: Abhijit Makhal, Cranberry Township, PA (US); Ayush Jhalani, Pittsburgh, PA (US); Darshan Shah, Pittsburgh, PA (US)

(73) Assignee: Intelligrated Headquarters, LLC, Mason, OH (US)

( * ) Notice: Subject to any disclaimer, the term of this patent is extended or adjusted under 35 U.S.C. 154(b) by 391 days.

(21) Appl. No.: 17/823,440

(22) Filed: Aug. 30, 2022

(65) Prior Publication Data

US 2024/0066706 A1  Feb. 29, 2024

(51) Int. Cl.
*B25J 9/16* (2006.01)
*B25J 19/02* (2006.01)
(Continued)

(52) U.S. Cl.
CPC ............ *B25J 9/1687* (2013.01); *B25J 9/1697* (2013.01); *B25J 19/023* (2013.01); *B65G 59/02* (2013.01); *G06Q 10/087* (2013.01); *G06T 7/60* (2013.01)

(58) Field of Classification Search
CPC .... G06Q 10/087; G06Q 10/083; G06Q 10/08; G06Q 10/0835; G06Q 10/0875;
(Continued)

(56) References Cited

U.S. PATENT DOCUMENTS

| 5,222,857 A | 6/1993 | Hasegawa |
|---|---|---|
| 6,898,486 B2 | 5/2005 | Watanabe et al. |

(Continued)

FOREIGN PATENT DOCUMENTS

| CN | 109353833 A | * | 2/2019 | ............ B65G 57/20 |
|---|---|---|---|---|
| JP | H11-322271 A | | 11/1999 | |

OTHER PUBLICATIONS

Extended European Search Report Mailed on Mar. 13, 2024 for EP Application No. 23188425, 8 page(s).

*Primary Examiner* — Khoi H Tran
*Assistant Examiner* — Alyse Tramanh Tran
(74) *Attorney, Agent, or Firm* — Alston & Bird LLP

(57) ABSTRACT

Various embodiments are directed to methods, apparatuses, systems, computing devices, computing entities, and the like for robotically depalletizing objects. In various embodiments, a controller-implemented method for robotic depalletization may comprise detecting a first object of a plurality of palletized objects arranged in a plurality of pallet layers, the first object defining at least a portion of a top pallet layer; identifying an initial pallet height defined by the first object; identifying a second pallet height defined by a second object of the plurality of palletized objects; detecting a pallet height difference based at least in part on the second pallet height; and determining that the top pallet layer has been depalletized based at least in part on a comparison of the pallet height difference to a threshold pallet layer height.

11 Claims, 13 Drawing Sheets

(51) Int. Cl.
*B65G 59/02* (2006.01)
*G06Q 10/08* (2024.01)
*G06Q 10/087* (2023.01)
*G06T 7/60* (2017.01)

(58) Field of Classification Search
CPC ............. G06Q 20/203; G06Q 30/0639; G06Q 30/0627; B65G 61/00; B65G 1/1373; B65G 57/24; B65G 1/1378; B65G 47/90; B65G 59/02; B65G 57/00; B65G 67/24; B65G 2201/0267; B65G 1/137; B65G 65/00; B65G 67/02; B65G 1/0407; B65G 47/71; B65G 1/00; B65G 1/0435; B65G 67/04; B65G 1/026; B65G 57/02; B65G 47/52; B65G 57/10; B65G 60/00; B65G 2203/0208; B65G 2207/46; B65G 59/00; B65G 59/063; B65G 57/28; B65G 47/5181; B65G 59/08; B65G 1/16; B65G 49/085; B65G 65/02; B65G 57/16; B65G 47/842; B65G 47/843; B65G 67/60; B65B 35/50; B65B 11/585; B65B 25/02; B65B 69/00

See application file for complete search history.

(56) References Cited

U.S. PATENT DOCUMENTS

| | | |
|---|---|---|
| 8,442,671 B2 | 5/2013 | Beck et al. |
| 9,771,217 B2 | 9/2017 | Lert et al. |
| 2003/0088337 A1* | 5/2003 | Watanabe ................ G06T 7/74 700/259 |
| 2017/0137236 A1* | 5/2017 | Sonoura ................ B65G 61/00 |
| 2018/0178386 A1 | 6/2018 | Eto et al. |
| 2021/0114826 A1 | 4/2021 | Simon et al. |

\* cited by examiner

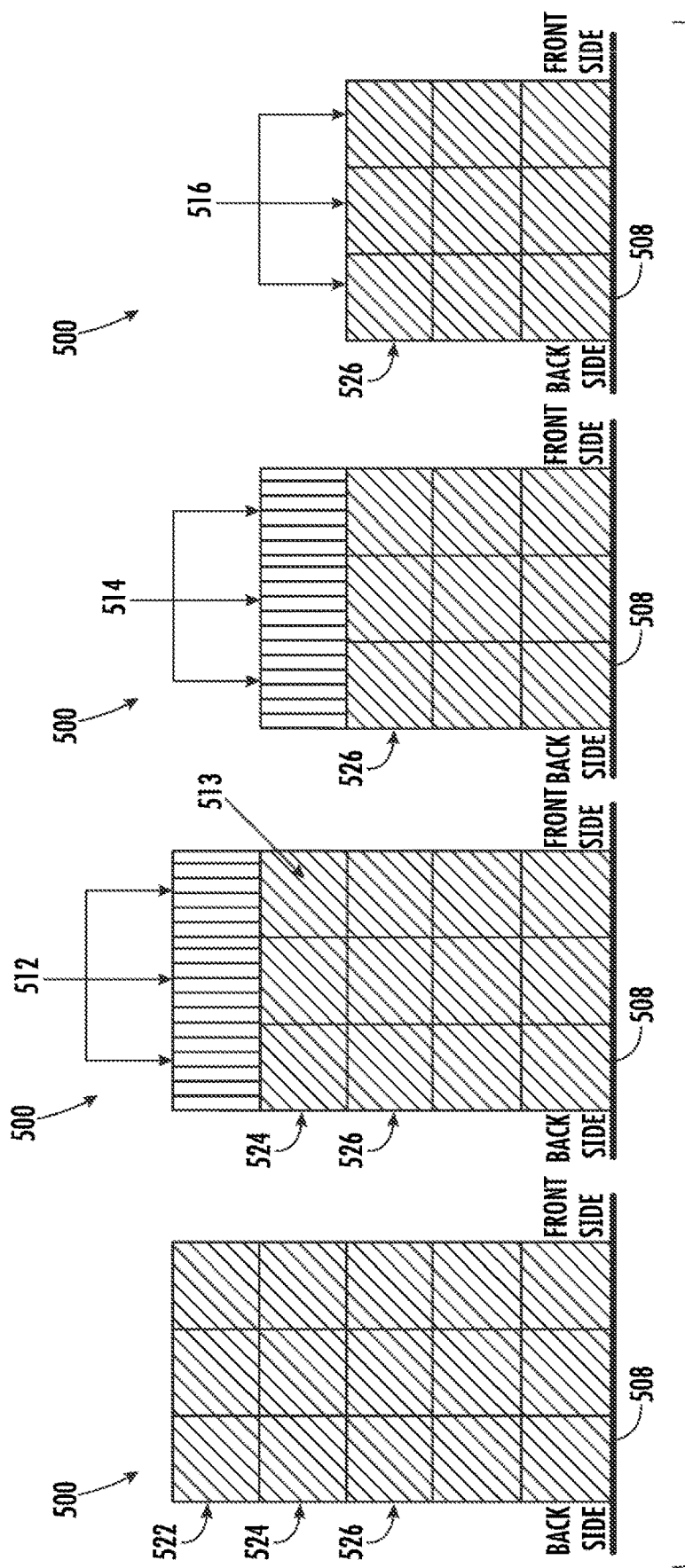

METHODS, SYSTEMS, AND COMPUTER PROGRAM PRODUCTS FOR EXECUTING PARTIAL DEPALLETIZATION OPERATIONS IN ROBOTIC DEPALLETIZATION

TECHNICAL FIELD

The present disclosure relates generally to automated industrial systems, and more particularly to robotics related to depalletization.

BACKGROUND

Palletizing refers to an operation of loading or conveying an object (e.g., carton, package, box, bag, article, etc.) into or onto a stack, such as loading or conveying the object onto a pallet, surface, region, location, or similar space. Depalletizing refers to the operation of unloading or moving an object (e.g., carton, package, box, bag, article, etc.) from a stack, such as away from a pallet, surface, region, location, or a similar space. Palletization and depalletization may be aided in some instances by mean of a robotic system configured for palletization and/or depalletization.

Many palletization and/or depalletization solutions face technical challenges and difficulties. For example, in circumstances wherein a partial depalletization of the plurality of objects in a stack is desired and/or requested by a user, the plurality of objects having one or more objects of different sizes, shapes, and/or configurations generates system inaccuracies and/or failures as the depalletization system interacts with and characterizes the plurality of objects defining the stack. Through applied effort, ingenuity, and innovation, Applicant has solved problems relating to robotic palletization and depalletization by developing solutions embodied in the present disclosure, which are described in detail below.

BRIEF SUMMARY

In general, the present disclosure provides methods, apparatuses, systems, computing devices, computing entities, and the like for robotically depalletizing objects. In various embodiments, a controller-implemented method for robotically depalletizing objects may comprise A controller-implemented method for robotic depalletization, the method comprising detecting a first object of a plurality of palletized objects arranged in a plurality of pallet layers, the first object defining at least a portion of a top pallet layer; identifying an initial pallet height defined by the first object; identifying a second pallet height defined by a second object of the plurality of palletized objects; detecting a pallet height difference based at least in part on the second pallet height; and determining that the top pallet layer has been depalletized based at least in part on a comparison of the pallet height difference to a threshold pallet layer height.

In various embodiments, the controller-implemented method may further comprise, upon determining that the top pallet layer has been depalletized, updating layer index data associated with the plurality of palletized objects to reflect a depalletization of the top pallet layer. In certain embodiments, the controller-implemented method may further comprise comparing the updated layer index data to a total pallet layer depalletization value. In certain embodiments, the controller-implemented method may further comprise, based at least in part on a determination that a depalletized layer value associated with a layer-based depalletization operation does not satisfy the total pallet layer depalletization value, initiating a depalletization of a second pallet layer of the plurality of pallet layers, the second pallet layer being defined at least in part by the second object. In various embodiments, updating the layer index data may comprise increasing a depalletized layer value associated with a layer-based depalletization operation. In certain embodiments, the controller-implemented method may further comprise, based at least in part on a determination that the depalletized layer value associated with the layer-based depalletization operation satisfies the total pallet layer depalletization value, ending the layer-based depalletization operation. In certain embodiments, the total pallet layer depalletization value may be defined by user input received by a depalletization system.

In various embodiments, determining that the top pallet layer has been depalletized may comprise determining that the pallet height difference is greater than or equal to the threshold pallet layer height. In certain embodiments, the pallet height difference may be defined by a difference between the initial pallet height and the second pallet height. In various embodiments, the controller-implemented method may further comprise receiving user input defining a user selection of a pallet layer-based depalletization mode; and initiating a layer-based depalletization operation based on the user selection of the pallet layer-based depalletization mode, the layer-based depalletization operation embodying a partial depalletization of the plurality of palletized objects. In certain embodiments, the user input may be further defined by a total pallet layer depalletization value corresponding to a user-selected number of pallet layers to be depalletized via layer-based depalletization operation.

In various embodiments, the second pallet height may be detected based at least in part on imaging data captured by the depalletization system. In various embodiments, the controller-implemented method may further comprise causing the depalletization system to remove the first object of the plurality of objects from the top pallet layer and relocate the first object to a secondary location.

Various embodiments are directed to a controller-implemented method for robotic depalletization, the method comprising receiving, at a depalletization system, user input defining a user selection of a SKU-based depalletization mode, wherein the user input further defines a total SKU depalletization value; calculating, based at least in part on imaging data captured by the depalletization system and associated with a plurality of palletized objects arranged at a pallet, one or more comparative dimension measures associated with at least a portion of the plurality of palletized objects, the plurality of palletized objects being defined by a plurality of object SKUs; identifying a first object SKU defined by a first portion of the plurality of objects based at least in part on a determination that the one or more comparative dimension measures associated with the first portion of the plurality of objects satisfies a comparative dimension threshold range; upon detecting that the first portion of the plurality of objects defining the first object SKU has been depalletized, updating SKU index data associated with the plurality of palletized objects to reflect a depalletization of the first object SKU; and determining that a depalletized SKU value associated with the SKU-based depalletization operation satisfies the total SKU depalletization value.

In various embodiments, the controller-implemented method may further comprise initiating the SKU-based depalletization operation based on the user selection of the SKU-based depalletization mode, the SKU-based depalletization operation embodying a partial depalletization of the plurality of palletized objects; and based at least in part on the determination that the depalletized SKU value associated with the SKU-based depalletization operation satisfies the total SKU depalletization value, ending the SKU-based depalletization operation. In various embodiments, updating the SKU index data associated with the plurality of palletized objects to reflect the depalletization of the first object SKU may comprise increasing the depalletized SKU value associated with the SKU-based depalletization operation.

In various embodiments, the controller-implemented method may further comprise, based at least in part on a determination that the depalletized SKU value associated with the SKU-based depalletization operation does not satisfy the total SKU depalletization value, initiating a second depalletization of a second object SKU defined by a first portion of the plurality of objects. In certain embodiments, the controller-implemented method may further comprise identifying the second object SKU defined by the second portion of the plurality of objects based at least in part on a second determination that the one or more comparative dimension measures associated with the second portion of the plurality of objects satisfies the comparative dimension threshold range; and, upon detecting that the second portion of the plurality of objects defining the second object SKU has been depalletized, updating the SKU index data associated with the plurality of palletized objects to reflect a depalletization of the second object SKU. In certain embodiments, the controller-implemented method may further comprise causing the depalletization system to remove one or more objects of the first portion of the plurality of objects defining the first object SKU from an arrangement at the pallet and relocate the one or more objects to a secondary location.

Various embodiments are directed to an apparatus comprising at least one processor and at least one non-transitory memory comprising a computer program code, the at least one non-transitory memory and the computer program code configured to, with the at least one processor, cause the apparatus to detect a first object of a plurality of palletized objects arranged in a plurality of pallet layers, the first object defining at least a portion of a top pallet layer; identify an initial pallet height defined by the first object; identify a second pallet height defined by a second object of the plurality of palletized objects; detect a pallet height difference based at least in part on the second pallet height; and determine that the top pallet layer has been depalletized based at least in part on a comparison of the pallet height difference to a threshold pallet layer height.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale and are intended for use in conjunction with the explanation in the following detailed description.

FIG. 5 illustrates diagrams illustrating example pallet layers on example pallets in accordance with various embodiments of the present disclosure;

DETAILED DESCRIPTION

Figure 1A:
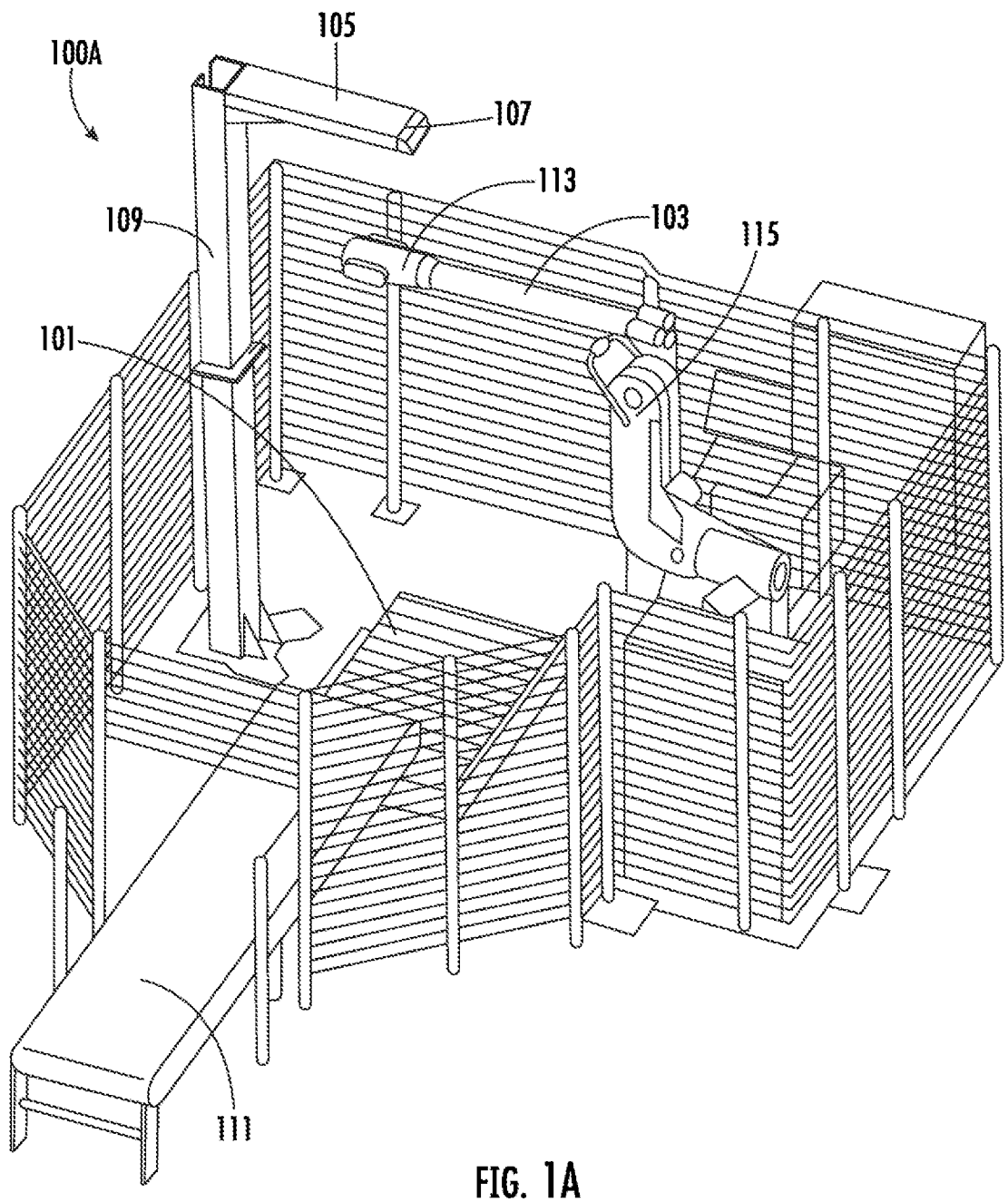
FIG. 1A is an example perspective view of an example depalletization system that can be used in accordance with various embodiments of the present disclosure.

Some embodiments of the present invention will be described in a more detailed manner hereinafter with reference to the accompanying drawings, in which some, embodiments of the invention are shown. Reference numbers refer to elements throughout the drawings. Multiple embodiments of the current invention may be embodied in different forms and should not be limited to the embodiments set forth herein. Rather, these embodiments are provided so that this disclosure will satisfy applicable legal requirements.

As used herein, the terms "approximately," "generally," and "substantially" refer to within manufacturing and/or engineering design tolerances for the corresponding materials and/or elements unless otherwise indicated. The use of such terms is inclusive of and is intended to allow independent claiming of specific values listed. Thus, use of any such aforementioned terms, or similarly interchangeable terms, should not be taken to limit the spirit and scope of embodiments of the present invention. As used in the specification and the appended claims, the singular form of "a," "an," and "the" include plural references unless otherwise stated. The terms "includes" and/or "including," when used in the specification, specify the presence of stated feature, elements, and/or components; it does not preclude the presence or addition of one or more other features, steps, operations, elements, components, and/or groups thereof.

Aspects of the present disclosure may be implemented as computer program products that comprises articles of manufacture. Such computer program products may include one or more software components including, for example, applications, software objects, methods, data structure, and/or the like. A software component may be coded in any of a variety of programming languages. An illustrative programming language may be a lower-level programming language such as an assembly language associated with a particular hardware architecture and/or operating system platform/system.

Other example of programming languages included, but are not limited to, a macro language, a shell or command language, a job control language, a script language, a database query, or search language, and/or report writing language. In one or more example embodiments, a software component comprising of instructions in one of the foregoing examples of programming languages may be executed directly by an operating system or other software component without having to be first transformed into another form. A software component may be stored as a file or other data storage methods. Software components of a similar type or functionally related may be stored together such as, for example, in a particular directory, folder, or library. Software components may be static (e.g., pre-established, or fixed) or dynamic (e.g., created or modified at the time of execution).

Additionally, or alternatively, aspects of the present disclosure may be implemented as a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media may include all computer-readable media (including volatile and non-volatile media).

In one aspect, a non-volatile readable storage may include a floppy disk, flexible disk, hard disk, solid-state storage (SSS) (e.g., a solid-state drive (SSD), solid state card (SSC), solid state module (SSM), enterprise flash drive, magnetic tape, and/or the like. A non-volatile computer-readable storage medium may also include compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one aspect, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where aspects are described to use a computer-readable storage medium, other types of computer-readable storage media may be substituted for or used in addition to the computer-readable storage media described above.

As should be appreciated, various aspects of the present disclosure may also be implemented as methods, apparatuses, systems, computing devices, computing entities, and/or the like. As such, aspects of the present disclosure may take the form of a data structure, apparatus, system, computing device, computing entity, and/or the like executing instructions stored on a computer-readable storage medium to perform certain steps or operations. Thus, aspects of the present disclosure may also take the form of an entirely hardware aspect, an entirely computer program product aspect, and/or an aspect that comprises combination of computer program products and hardware performing certain steps or operations.

Aspects of the present disclosure are described below with reference to block diagrams and flowchart illustrations. Thus, it should be understood that each block of the block diagrams and flowchart illustrations may be implemented in the form of a computer program product, a solely hardware aspect, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such aspects can produce specifically configured machines performing the steps or operations specified in the block diagrams and flowchart illustrations. Accordingly, the block diagrams and flowchart illustrations support various combinations of aspects for performing the specified instructions, operations, or steps.

As used herein, the phrase "in an embodiment," "in one embodiment," "according to one embodiment," and the like generally mean that the particular feature, structure, or characteristic following the phrase may be included in at least one embodiment of the present disclosure and may be included in more than one embodiment of the present disclosure.

The figures are not to limit the scope of the present embodiment of the invention or the appended claims. Aspects of the example embodiment are described below with reference to example applications for illustration. It should be understood that specific details, relationships, and methods are set forth to provide a full understanding of the example embodiment. One of ordinary skill in the art recognize the example embodiment can be practice without one or more specific details and/or with other methods.

In environments such as distribution centers, warehouses, and/or the like, objects may be conveyed on a pallet, and one or more robotic depalletization devices may be utilized to depalletize objects (e.g. boxes, articles, products) from a stack on the pallet. In some embodiments, at least some of the objects in the stack are of mixed, different SKUs, which indicates that the objects in the stack are of different types (e.g. having different sizes and/or shapes). In such example, an example depalletization system may rely on vision system (such as a perception subsystem) to determine the size and/or the shape of the objects so that the depalletization device can depalletize the objects from the pallet (for example, calculate the pose of the depalletization device based at least in part on the size and/or the shape of the objects). In various embodiments described herein, an exemplary depalletization system may be configured to execute a partial depalletization operation associated with the stack of objects by operating in one of a layer-based depalletization mode and a SKU-based depalletization mode, such as, for example, in response to user-drive instructional inputs, to depalletize a select portion of a plurality of objects arranged in the stack. The present invention includes methods of executing both a layer-based and a SKU-based depalletization operation that facilitates a partial depalletization according to user-specific commands with an at least substantially minimized operational error rate in mixed-SKU circumstances.

FIG. 1A is an example perspective view of an example depalletization system that can be used in accordance with various aspects of the present disclosure. It will be understood that the system 100A can also be used as a palletization system. In such an embodiment, the picking order is reversed from the depalletization embodiments discussed herein, with the system planning and stacking objects into a pallet having a minimum volume according to the reverse of the sequencing described herein with respect to depalletization.

In the example shown in FIG. 1A, the example depalletization system 100A comprises a depalletization device 103. In some aspects, the depalletization device 103 is part of an execution subsystem of the depalletization system 100A.

In the example shown in FIG. 1A, the depalletization device 103 may be in the form of a robotic depalletization. For example, the depalletization device 103 may comprise an end effector 113 and a robotic arm 115 connected to the end effector 113. In some aspects, the depalletization device 103 may comprise one or more controller, sensors, and/or drives to cause and control operations of the end effector 113 and/or the robotic arm 115.

In some aspects, the depalletization device 103 is positioned adjacent to a pallet 101. In some aspects, to depalletize an object from the pallet 101, one or more grasp poses and grasp points are calculated for the depalletization device 103. For example, the robotic arm 115 may be moved and/or rotated so that the end effector 113 can be positioned on an object from the pallet 101. In some aspects, the end effector 113 may retrieve and/or grasp the object (for example, through suction mechanism, and/or the like), and the robotic arm 115 may be moved so as to lift the object to a lift height (and the height of the end effector 113 is referred to as a grasp pose height). Subsequent to lifting the object, the robotic arm 115 may be moved and/or rotated so that the object that is grasped by the end effector 113 is positioned above the conveyor 111. Subsequently, the end effector 113 releases the object onto one or more deposit locations, which in some aspects is the conveyor 111, thereby completing the operation of depalletizing the object from the pallet 101 onto the conveyor 111. It will be understood that one or more deposit locations could include any number of locations considered suitable for depositing objects, including, but not limited to, a warehouse floor, a truck or trailer bed, a cargo or shipping container, or rail freight transport. It will further be understood that, according to some aspects, the one or more deposit locations (e.g., the conveyor 111) may include another pallet or loading area, such as (but not limited to) when system 100A is being used as a palletizing system.

As described above, a depalletization system may rely on a perception subsystem 202 to capture data related to the objects such that the grasp poses and grasp points of the depalletization device can be determined. For example, in various embodiments, as described herein in further detail, the perception subsystem of an exemplary depalletization system may be used to determine a threshold pallet height value, such as, for example, based at least in part on a detected maximum height defined by one of the palletized objects arranged at a pallet. Referring now to the examples shown in FIG. 1A, the example depalletization system 100A comprises a vision structure 105. In some aspects, the vision structure 105 is part of a perception subsystem of the depalletization system 100A.

In some aspects, the vision structure 105 is positioned adjacent to the pallet 101. For example, the vision structure 105 comprises a vertical beam 109 that is connected to a horizontal beam 107. In some aspects, one or more image capture devices may be disposed on the horizontal beam 107 and/or the vertical beam 109.

For example, a 2-D image capture device may be disposed near an end of the horizontal beam 107 and facing the pallet 101 so as to capture a 2-D image that is a top view of the pallet 101 (e.g., showing objects on the top pallet layer). Examples of 2-D image capture devices may include, but are not limited to, cameras, 2-D image sensors, and/or the like. In some aspects, the 2-D image may be used to determine a width and/or a length of the object.

Additionally, or alternatively, a 3-D image capture device may be disposed on the horizontal beam 107 and facing the pallet 101 so as to capture a 3-D image of the pallet 101. In some aspects, the 3-D image capture device may be disposed moveably along the vertical beam 109 and/or the horizontal beam 107. Examples of 3-D image capture devices may include, but are not limited to, time-of-flight image sensors, stereoscopic imaging sensors, and/or the like. In some aspects, the 2-D image may be used to determine a width and/or a height of the object.

In some aspects, a height sensing device may be disposed at the end of the conveyor 111 adjacent to the pallet 101. In some aspects, the height sensing device may be part of the depalletization system 100A and is configured to sense height data, details of which are described herein. Examples of height sensing devices include, but are not limited to, LiDAR sensors and/or the like. The system may also use a horizontal position sensing device or a single device may perform the functions of both the horizontal and height sensing devise using the hardware and/or software described herein.

Figure 1B:
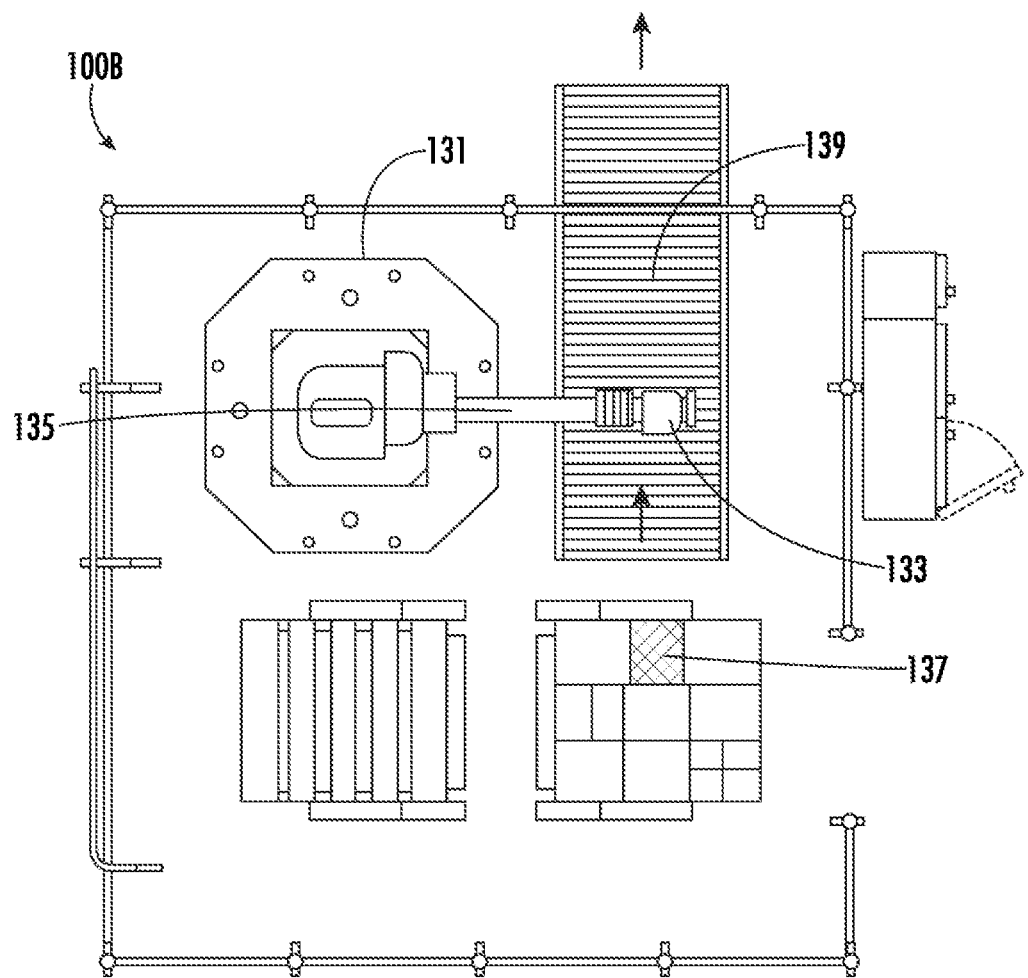
FIG. 1B is an example diagram illustrating an example depalletization system that can be used in accordance with various embodiments of the present disclosure.

FIG. 1B is an example diagram illustrating an example depalletization system 100B that can be used in accordance with various aspects of the present disclosure.

In the example shown in FIG. 1B, the example depalletization system 100B comprises a depalletization device 131 that includes an end effector 133 connected to a robotic arm 135. In some aspects, the end effector 133 may depalletize objects from the pallet 137 onto the conveyor 139, similar to those described above in connection with FIG. 1A.

FIG. 1B is an example diagram illustrating an example depalletization system that can be used in accordance with various aspects of the present disclosure.

In the example shown in FIG. 1*i*, the example depalletization system 100B comprises a depalletization device 131 that includes an end effector 133 connected to a robotic arm 135. In some aspects, the end effector 133 may depalletize objects from the pallet 137 onto the conveyor 139, similar to those described above in connection with FIG. 1A.

Figure 2:
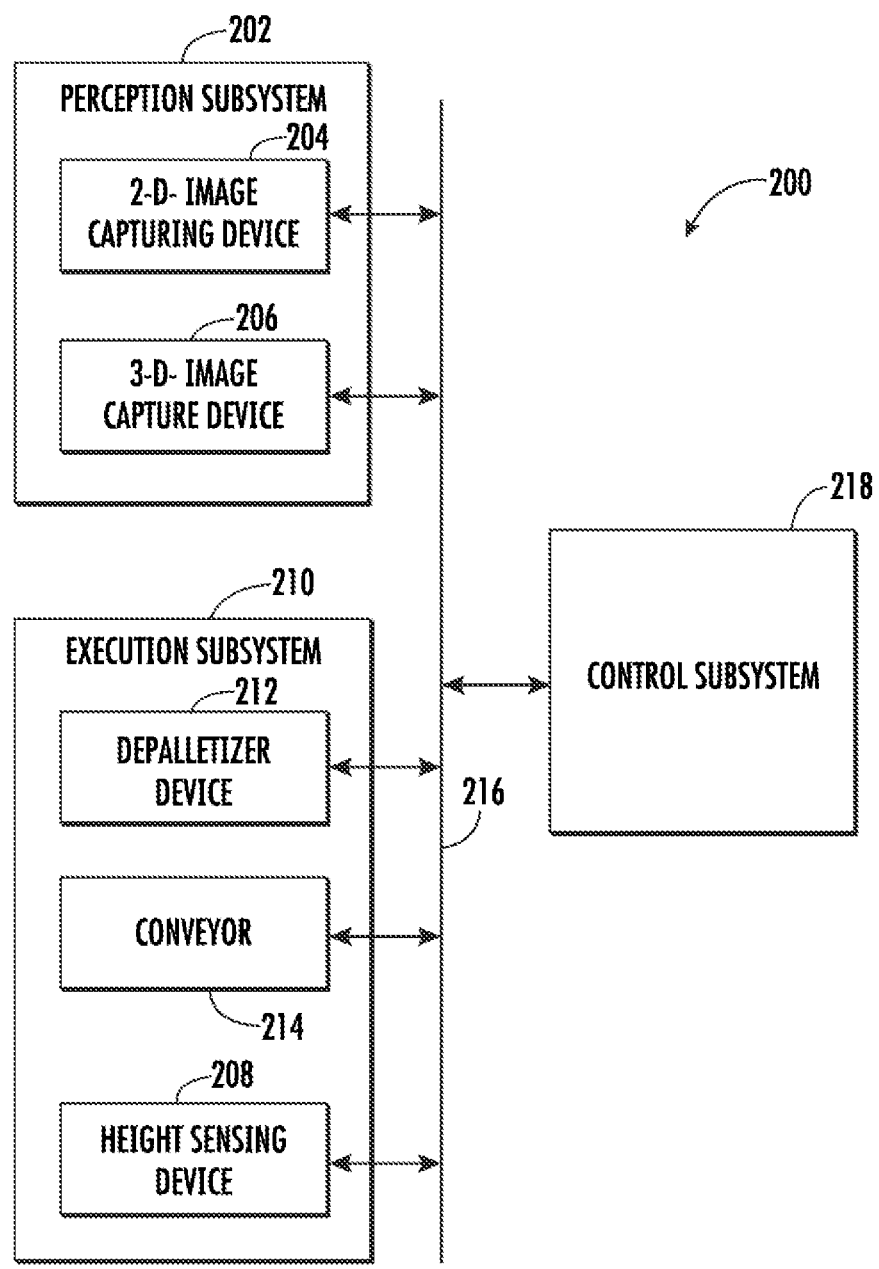
FIG. 2 is an example schematic representation of example components in an example depalletization system in accordance with various embodiments of the present disclosure.

FIG. 2 is an example schematic representation of example components in an example depalletization system in accordance with various aspects of the present disclosure.

In particular, FIG. 2 illustrates example data communications between various components of the example depalletization system 200.

In the example shown in FIG. 2, the example depalletization system 200 comprises a perception subsystem 202, an execution subsystem 210, and a control subsystem 218 that can exchange data and/or information via the system bus 216.

In some aspects, the perception subsystem may generate imaging data and transmit the imaging data to the control subsystem 218 via the system bus 216. In particular, the perception subsystem 202 may comprise a 2-D image capturing device 204 (similar to the 2-D image capturing device described above in connection with at least FIG. 1A). In some aspects, the 2-D image capturing device 204 may generate 2-D image data and transmit the 2-D image data to the control subsystem 218 via the system bus 216. Additionally, or alternatively, the perception subsystem 202 may comprise a 3-D image capturing device 206 (similar to the 3-D image capturing device described above in connection with at least FIG. 1A). In some aspects, the 3-D image capturing device 206 may generate 3-D image data and transmit the 3-D image data to the control subsystem 218 via the system bus 216.

In some aspects, the control subsystem 218 may transmit control instructions to the execution subsystem 210 via the system bus 216 so as to control the operations associated with the devices of execution subsystem 210.

In some aspects, the execution subsystem 210 may comprise a height sensing device 208. In some aspects, the height sensing device 208 may generate height data and transmit the height data to the control subsystem 218.

For example, the execution subsystem 210 may comprise a depalletization device 212. In such an example, the control subsystem 218 may transmit control instructions to the depalletization device 212 so as to control the operations of the depalletization device 212 and/or cause the depalletization device 212 to operate in a certain way, details of which are described herein.

Additionally, or alternatively, the execution subsystem 210 may comprise a conveyor 214. In such an example, the control subsystem 218 may transmit control instructions to the conveyor 214 so as to control the operations of the conveyor 214 and/or cause the conveyor 214 to operate in a certain way.

In some aspects, the system bus 216 may be in various forms. For example, the system bus 216 may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the system bus 216 may be configured to communicate via wireless external communication networks using any of a variety of protocols, such as general packet radio service (GPRS), Universal Mobile Telecommunications System (UMTS), Code Division Multiple Access 1900 (CDMA1900), CDMA1900 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The control subsystem 218 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Figure 3:
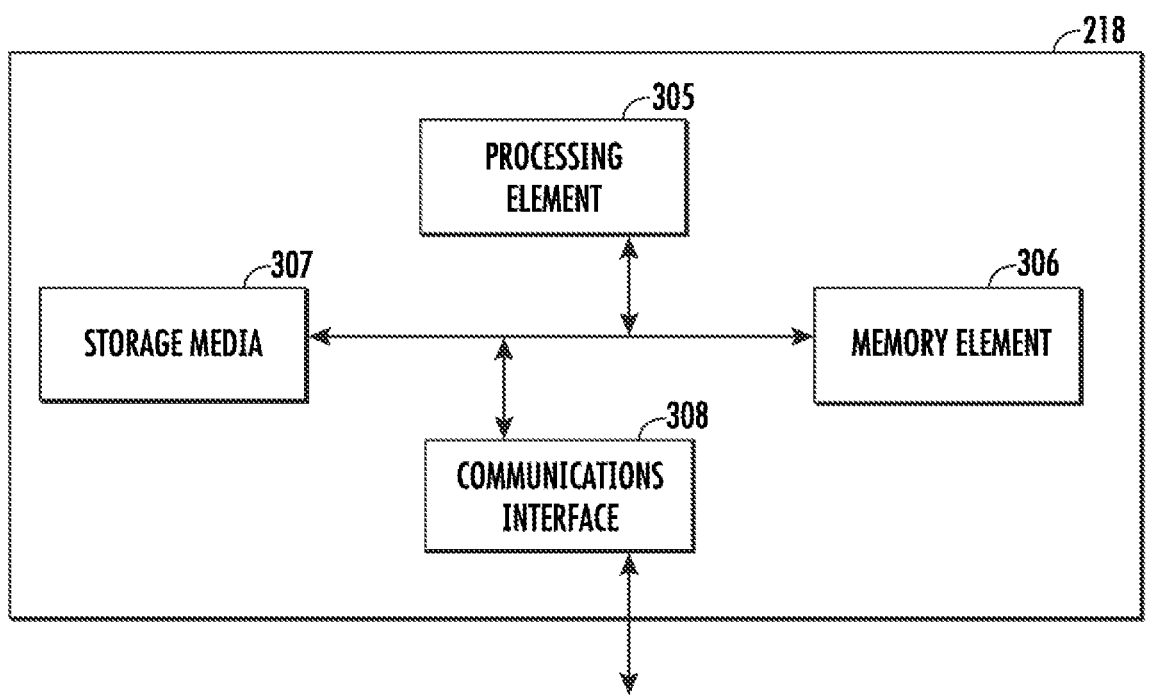
FIG. 3 is a schematic representation of example components in an example control subsystem in accordance with various embodiments of the present disclosure.

FIG. 3 is a schematic representation of example components in an example control subsystem in accordance with various aspects of the present disclosure.

As shown in FIG. 3, in one aspect, the control subsystem 218 may include or be in communication with one or more processing elements (for example, processing element 305) (also referred to as processors, processing circuitry, and/or similar terms used herein interchangeably) that communicate with other elements within the control subsystem 218 via a bus, for example, or network connection. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware aspect or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to aspects of the present disclosure when configured accordingly.

In one aspect, the control subsystem 218 may further include or be in communication with volatile media (also referred to as volatile storage, memory, memory storage, memory circuitry and/or similar terms used herein interchangeably). In one aspect, the volatile storage or memory may also include one or more memory element 306 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory element 306 may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305 as shown in FIG. 3. Thus, the databases, database instances, database management system entities, data, applications, programs, program modules, scripts, source code, object code, byte code, compiled code, interpreted code, machine code, executable instructions, and/or the like may be used to control certain aspects of the operation of the control subsystem 218 with the assistance of the processing element 305 and operating system.

In one aspect, the control subsystem 218 may further include or be in communication with non-volatile media (also referred to as non-volatile storage, memory, memory storage, memory circuitry and/or similar terms used herein interchangeably). In one aspect, the non-volatile storage or memory may include one or more non-volatile storage or storage media 307 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or storage media 307 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to may refer to a structured or unstructured collection of information/data that is stored in a computer-readable storage medium.

Storage media 307 may also be embodied as a data storage device or devices, as a separate database server or servers, or as a combination of data storage devices and separate database servers. Further, in some aspects, storage media 307 may be embodied as a distributed repository such that some of the stored information/data is stored centrally in a location within the system and other information/data is stored in one or more remote locations. Alternatively, in some aspects, the distributed repository may be distributed over a plurality of remote storage locations only. An example of the aspects contemplated herein would include a cloud data storage system maintained by a third-party provider and where some or all of the information/data required for the operation of the recovery system may be stored. Further, the information/data required for the operation of the recovery system may also be partially stored in the cloud data storage system and partially stored in a locally maintained data storage system. More specifically, storage media 307 may encompass one or more data stores configured to store information/data usable in certain aspects.

According to some aspects, and as shown in at least FIGS. 2 and 3, the depalletization system 200 may be a computer program product 218 including at least one non-transitory computer-readable storage medium 307 having computer-readable program code portions stored therein. The computer-readable program code portions may include an executable portion. The executable portion may be configured to detect a first object (e.g., object 402 in stack 400 in FIG. 4) of a plurality of palletized objects (e.g., objects 402, 404, 406, 410, 412, 414, etc. in stack 400 in FIG. 4) arranged in a plurality of pallet layers (e.g., pallet layers 422, 424, etc. in FIG. 4), the first object (e.g., object 402) defining at least a portion of a top pallet layer (e.g., top pallet layer 422). (Reference is made to FIG. 4 and FIG. 5 and the exemplary embodiments illustrated therein, but it will be understood that the depalletization system 200 may relate to any suitable number of palletized objects). In various embodiments, the executable portion may also be configured to identify an initial pallet height defined by the first object (e.g., object 402), and, further, identify a second pallet height defined by a second object of the plurality of objects defining a stack. In various embodiments, the executable portion may also be configured to detect a pallet height difference based at least in part on the second pallet height. Further, in various embodiments, the executable portion may also be configured to determine that the top pallet layer (e.g., top pallet layer 422) has been depalletized based at least in part on a comparison of the pallet height difference to a threshold pallet layer height. In various embodiments, the executable portion may also be configured to cause a depalletization system to remove the first object of the plurality of objects from the top pallet layer and relocate the first object to a secondary location.

Further, in various embodiments, the executable portion may be configured to receive, at a depalletization system (e.g., an exemplary depalletization system 100A as described in reference to FIGS. 1A-3), user input defining a user selection of a SKU-based depalletization mode. In various embodiments, the user input may further define a total SKU depalletization value, as described herein. The executable portion may be configured to store depalletization data, such as, for example the total SKU depalletization value and/or a total pallet layer depalletization value, at one or more storage media. Further, in various embodiments, the executable portion may be configured to calculate, based at least in part on imaging data captured by the depalletization system and associated with a plurality of palletized objects (e.g., objects 402, 404, 406, 410, 412, 414, etc. in stack 400) arranged at a pallet (e.g., pallet 408 in FIG. 4), one or more comparative dimension measures associated with at least a portion of the plurality of palletized objects. For example, as described herein, the plurality of palletized objects may be defined by a plurality of object SKUs. In various embodiments, the executable portion may be configured to identify a first object SKU defined by a first portion of the plurality of objects based at least in part on a determination that the one or more comparative dimension measures associated with the first portion of the plurality of objects satisfies a comparative dimension threshold range. In various embodiments, the executable portion may also be configured to, upon detecting that the first portion of the plurality of objects defining the first object SKU has been depalletized, update SKU index data associated with the plurality of palletized objects to reflect a depalletization of the first object SKU. Further, in various embodiments, the executable portion may also be configured to determine that a depalletized SKU value associated with the SKU-based depalletization operation satisfies the total SKU depalletization value.

In one or more embodiments, the executable portion of the computer-readable program code portion is further configured to represent a plurality of palletized objects (e.g., objects 402, 404, 406, 410, 412, 414, etc.) as an object set of electronic data points, including a first object set of electronic data points associated with the first object of the first set, and the end effector (e.g., end effector 113 of system 100A) as an end effector set of electronic data points. The executable portion may also be configured to simulate the removal of the first object from the plurality of objects arranged in the stack by simulating the removal of first object set of electronic data points associated with the first object from the object set of electronic data points by means of the end effector set of electronic data points. In various embodiments, the executable portion of the computer-readable program code portion is further configured to determine a pallet height associated with each of the plurality of palletized objects based on the respective object set of electronic data points associated with each object of the plurality. Further, in various embodiments, the executable portion of the computer-readable program code portion is configured to represent, characterize, define, and/or otherwise identify each pallet layer defined by the plurality of objects based on the object set of electronic data points. For example, in various embodiments, the executable portion of the computer-readable program code portion is configured to identify each of the plurality of objects having a pallet height that is within a predetermined threshold layer height range of an initial pallet height associated as being part of the same pallet layer within the stack.

As indicated, in one aspect, the control subsystem 218 may also include one or more network and/or communications interface 308 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the control subsystem 218 may be configured to communicate via wireless external communication networks using any of a variety of protocols, such as general packet radio service (GPRS), Universal Mobile Telecommunications System (UMTS), Code Division Multiple Access 1900 (CDMA1900), CDMA1900 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The control subsystem 218 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Figure 4:
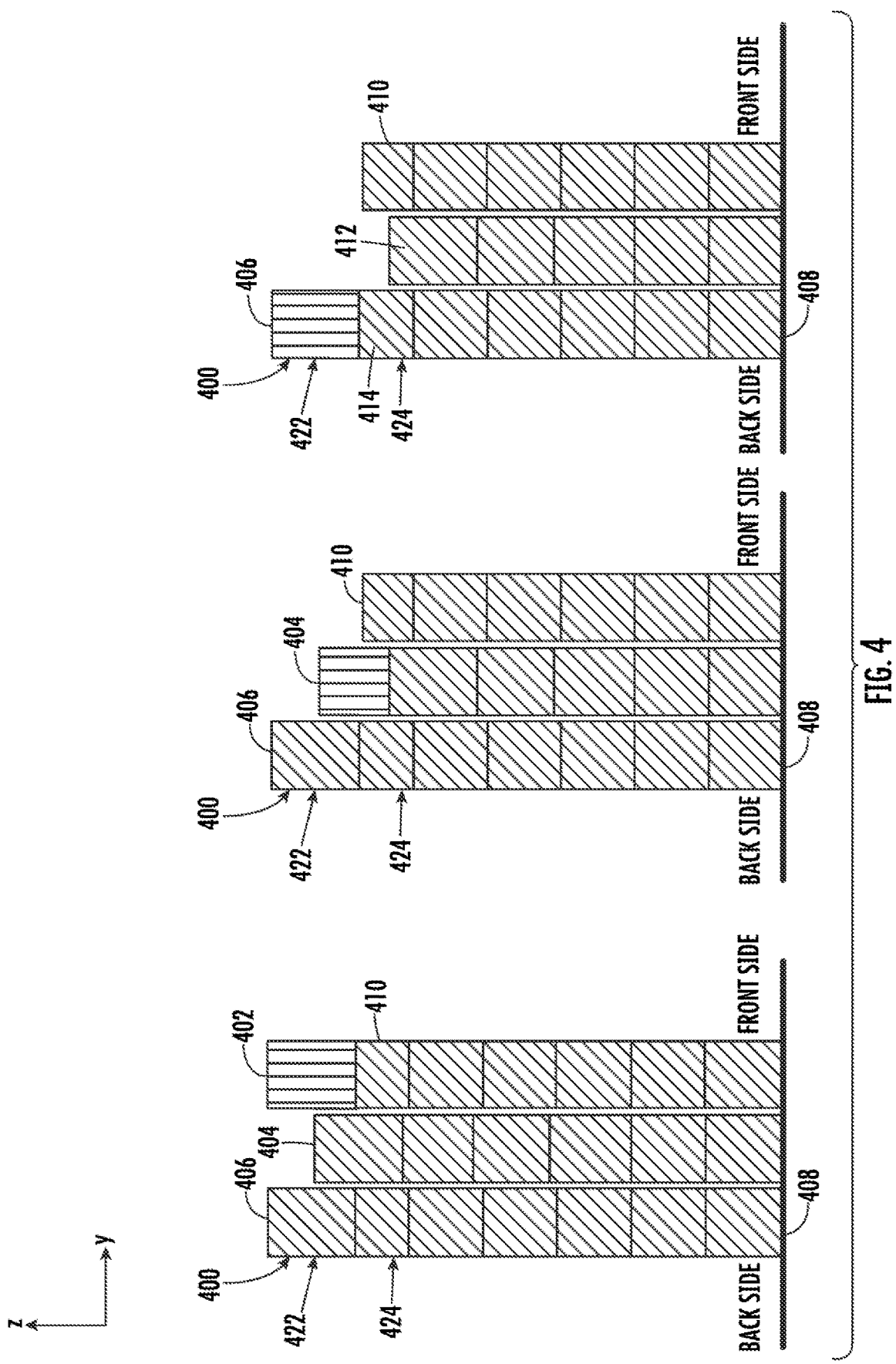
FIG. 4 illustrates diagrams illustrating example pallet layers on example pallets in accordance with various embodiments of the present disclosure.

FIG. 4 and FIG. 5 are example diagrams illustrating example depalletization of objects on example pallets in accordance with various aspects of the present disclosure. In the various embodiments disclosed herein, the robotic systems, motion planning systems, vision systems, and other hardware and/or software systems described herein may be used to depalletize the various objects according to the processes shown in FIG. 4 and/or FIG. 5.

As shown in FIG. 4, there is a stack 400 of palletized objects (e.g., packages) configured to be partially depalletized via a layer-based depalletization operation executed by a depalletization system configured to execute one or more algorithms. In some aspects, one or more depalletization operations may be executed (e.g., via a depalletization system) in order to depalletize a portion of the plurality of objects (e.g., less than the entire plurality of objects) of the stack 400. For example, there may be a plurality of palletized objects 402, 404, 406 on a pallet 408 to be removed. As illustrated in FIG. 4, the stack 400 may be defined by a plurality of palletized objects arranged in a plurality of pallet layers (e.g., a top pallet layer 422, a second pallet layer 424). For example, as illustrated, the plurality of layers may include a top pallet layer 422 and one or more additional pallet layers provided there below, each of which may be defined by a respective one or more objects of the plurality provided in an at least partially horizontal arrangement relative to one another. In one or more embodiments, the "front side" may be defined as a first side of palletized stack that is closest to and/or oriented in a direction that is closest to facing a designated location for depositing objects. The "back side" may be defined as a second side of palletized stack that is opposite the front side. In some aspects, the pallet 408 may be defined as any location that contains a stack of objects (such as stack 400) for depalletizing, without regard to the structure or composition of the pallet 408. FIG. 4 illustrates an exemplary representation of various steps of a layer-based depalletization operation in which a top pallet layer defined by a portion of a plurality of palletized objects, as described herein, is depalletized via the removal of the objects defining the top pallet layer from the stack 400 (e.g., to one or more designated locations).

In various embodiments, one or more of the plurality of pallet layers defined by the plurality of objects of the stack 400 may be depalletized via execution of a layer-based depalletization operation. For example, in various embodiments, as described herein, the stack 400 may be partially depalletized by removing less than all of the plurality of pallet layers defined by the plurality of objects from the stack 400. In the depicted embodiment, the robotic system executing a layer-based depalletization operation depalletizes the objects in horizontal layers (e.g., working front-to-back). In some aspects, a horizontal layer may be marked as, for example, "top pallet layer" 422 (e.g., the layer in which the first, second, and third objects 402, 404, 406) are placed.

In various embodiments, as shown in FIG. 4, a first object 402 defining a portion of a top pallet layer 422 may be detected (e.g., by a depalletization system 200). For example, as described herein, one or more subsystems of an exemplary depalletization system (e.g., a perception subsystem and/or an execution subsystem) may identify, based on imaging data captured by the depalletization system, an initial pallet height defined by the first object 402. For example, the depalletization system may identify the first object 402 as being the first (e.g., only) object of the plurality defined by the stack 400 to have been detected, and may associate the initial pallet height with the top pallet layer 422. In various embodiments, the exemplary depalletization system may be configured to execute a depalletization operation (e.g., a layer-based depalletization operation) by, first, manipulating an end effector, as described herein, to remove the first object 402 of the top pallet layer 422 of the stack 400. Further, the depalletization system may detect a second object 404 of the plurality of objects of the stack 400 arranged at the pallet 408, and a second pallet height defined by the second object 404 may be identified. In various embodiments, the exemplary depalletization system may detect a pallet height difference based at least in part on a comparison of the second object height defined by the second object 404 to the initial object height defined by the first object 402. In various embodiments, as described herein, the exemplary depalletization system may be further configured to determine whether the second object 404 defines part of the top pallet layer 422 (or, alternatively, defines part of a second pallet layer 424 disposed beneath the top pallet layer 422) based on a comparison of the detected pallet height difference (e.g., as defined by the first and second objects 402, 404) and a threshold pallet layer height. A horizontal pallet layer may be determined, in some aspects, by determining the coordinates of a top surface of an object (e.g., first object 402) and the max height of each object that is being depalletized (or palletized, according to some aspects). In various embodiments, to identify whether the pallet height difference defined by various objects is above or below the threshold pallet layer height, an exemplary system may image the stack of objects and compute a height associated with at least a portion of the objects. In some aspects, system operators may estimate the box's height by means of a measuring device (e.g., a laser with measurement functionality). For example, a vision sub-system may identify a candidate object or objects to be picked based on the layering and selection algorithms discussed herein. The system may then detect the pallet height of the object, such as for threshold determination purposes, using a measurement of the height of the bottom of the box (e.g., with the laser measuring device discussed above). The computed height may be a single pallet height value based on one or more landmarks associated with the object. For example, in various embodiments, the height computed for a given object may be computed as a top, bottom, center, grasping location, or other location associated with the object as determined by one or more image processing algorithms (e.g., a machine learning image recognition model) and/or motion planning algorithms performed by the systems. For example, any object having a top surface coordinate height within one max height of the highest measured object may be identified as a single pallet layer, from which the algorithm may proceed as described herein. The max height may be predetermined, such as by recording a maximum package used in the palletization system.

For example, in order to identify whether the top pallet level 422 has been fully depalletized, an exemplary depalletization system may compare a second pallet height defined by the second object 404 to an initial pallet height defined by the first object 402 and associated with the top pallet layer. For example, such a comparison may include detecting a pallet height difference defined by a difference between the second pallet height defined by the second object 404 and the initial pallet height defined by the first object 402. Further, an exemplary depalletization system may compare the detected pallet height difference to a threshold pallet layer height, which may be a predetermined value, as described herein. In various embodiments, as described in further detail herein, a determination that the pallet height difference defined by the second pallet height and the initial pallet height is greater than or equal to the threshold pallet layer height may indicate that the second object 404 defines part of a second pallet level 424 distinct from the top pallet level 422. Further, in various embodiments, such as, for example, the exemplary embodiments illustrated in FIG. 4, a determination that the pallet height difference defined by the second pallet height (e.g., associated with a second object 404) and the initial pallet height (associated with the first object) is less than the threshold pallet layer height may indicate that the second object 404 is arranged within the same top pallet level 422 as the first object 402. As shown, the detection of a pallet heights defined by other objects within the stack 400 and the comparison of the pallet height differences defined by the respective pallet heights and the initial pallet height (e.g., associated with the first object 402) relative to the threshold pallet layer height may be repeated for one or more additional objects until a detected pallet height difference defined between an object of the plurality and the initial pallet height is determined to be greater than the threshold pallet layer height. For example, FIG. 4 illustrates a top pallet layer 422 that includes a third object 406, such as, for example, based on a detected pallet height difference defined by a third pallet height associated with the third object 406 and the initial pallet height (associated with the first object 402) that is less than the threshold pallet layer height. In various embodiments, an exemplary robotic system may be configured to execute a layer-based depalletization operation by clearing (e.g., depalletizing) each of the objects defined within a pallet layer (e.g., each of objects 402, 404, and 406 within the top pallet layer 422) before determining whether to move on to the next pallet layer (e.g., a "second pallet layer" 424) for depalletization, according to some aspects.

In various embodiments, to identify whether the pallet height difference defined by various objects is above or below the threshold pallet layer height, an exemplary system may image the stack of objects and compute a height associated with at least a portion of the objects. In some aspects, system operators may estimate the box's height by means of a measuring device (e.g., a laser with measurement functionality). For example, a vision sub-system may identify a candidate object or objects to be picked based on the layering and selection algorithms discussed herein. The system may then detect the pallet height of the object, such as for threshold determination purposes, using a measurement of the height of the bottom of the box (e.g., with the laser measuring device discussed above). The computed height may be a single pallet height value based on one or more landmarks associated with the object. For example, in various embodiments, the height computed for a given object may be computed as a top, bottom, center, grasping location, or other location associated with the object as determined by one or more image processing algorithms (e.g., a machine learning image recognition model) and/or motion planning algorithms performed by the systems.

As described, upon determining that a pallet height difference defined by a detected pallet height associated with an additional object and the initial pallet height associated with the top pallet layer 422 satisfies (e.g., is greater than or equal to) the threshold pallet layer height, a determination may be made that that the top pallet layer has been fully depalletized. In various embodiments, upon determining that the top pallet layer 422 has been fully depalletized (e.g., cleared), layer index data associated with the plurality of palletized objects of the stack 400 may be updated by the depalletization system to reflect the depalletization of the top pallet layer 422. In various embodiments, layer index data may comprise data stored by an exemplary depalletization system that corresponds to the configuration of the stack 400 and the arrangement of the plurality of objects and/or the plurality of pallet levels defined therein. For example, the layer index data associated with the stack 400 may embody data that corresponds to one or more configurations, rearrangements, depalletization operations, and/or the like associated with the stack 400 that is capable of being retrieved, processed, updated, and/or stored by a depalletization system to at least partially characterize a status of the stack 400 and/or a depalletization operation associated therewith. For example, in various embodiments, updating the layer index data may comprise increasing a depalletized pallet layer value associated with the layer-based depalletization operation based on the determination that the top pallet layer 422 has been cleared. The depalletized pallet layer value associated with the layer-based depalletization operation may correspond to the number of pallet layers that have been depalletized during the layer-based depalletization operation. The depalletized pallet layer value may be increased by a value of 1 as an indication that a pallet layer of the stack 400, such as, for example, the top pallet layer 422, has been fully depalletized.

Further, as described, upon determining that a pallet height difference defined by a detected pallet height associated with an additional object and the initial pallet height associated with the top pallet layer 422 satisfies (e.g., is greater than or equal to) the threshold pallet layer height, the additional object may be identified as part of a second pallet level 424 provided below the top pallet level 422 and, further, a determination may be made that that the top pallet layer has been fully depalletized. For example, as illustrated in FIG. 4, upon determining that a pallet height difference between a fourth pallet height associated with the fourth object 410 and the initial pallet height associated with the top pallet layer 422 satisfies is greater than the threshold pallet layer height, the fourth object 410 may be identified as part of a second pallet level 424. In such an exemplary circumstance, an exemplary depalletization system may determine that the fourth object 410 is the first object of the plurality to be defined as part of the second pallet level 424, and, further, may define the detected fourth pallet height as being the initial pallet height associated with the second pallet layer 424. As described above with respect to the top pallet layer 422 and the initial pallet height defined by the first object 402, the determination of whether an additional object of the plurality is positioned within the second pallet layer 424 may be based on a comparison of the detected pallet height of the additional object and the initial pallet height defined by the fourth object 410 that is associated with the second pallet layer 424 (e.g., and, further, a comparison of the pallet height difference defined thereby relative to the threshold pallet layer height).

In various embodiments, an exemplary depalletization system may be further configured to determine whether to proceed with depalletizing one or more additional pallet layers defined by the stack 400, such as, for example, the second pallet layer 424, by determining whether the depalletized layer value associated with the layer-based depalletization operation satisfies a total pallet layer depalletization value. As described herein, the total pallet layer depalletization value associated with a layer-based depalletization operation may be the total number of pallet layers that is to be depalletized via the layer-based depalletization operation (e.g., a user-selected value received as by the depalletization device as user input) corresponding to a user-selected. In various embodiments, upon determining that a pallet level (e.g., the top pallet level 433) has been cleared during execution of a layer-based depalletization operation, the updated depalletized pallet layer value defining by the layer index data may be compared to the total pallet layer depalletization value associated with the layer-based depalletization operation. For example, in various embodiments wherein the depalletized layer value associated with the layer-based depalletization operation is determined to satisfy the total pallet layer depalletization value (e.g., the depalletized layer value is equal to the total pallet layer depalletization value), as described herein, the layer-based depalletization operation may be ended. Further, in various embodiments wherein the depalletized layer value associated with the layer-based depalletization operation is determined to not satisfy the total pallet layer depalletization value (e.g., the depalletized layer value is less than the total pallet layer depalletization value), as described herein, the exemplary depalletization system may initiate a depalletization of the second pallet layer 424 of the stack 400.

For example, FIG. 5 illustrates an exemplary representation of various steps of a layer-based depalletization operation in which a plurality of pallet layers defined within a stack 500 are depalletized via the removal of each of the palletized objects defining the respective pallet layers from the stack 500 (e.g., to one or more designated locations). As illustrated, the removed and/or depalletized objects may be represented as iteratively disappearing from the illustrated stack 500 based on the depalletization of the plurality of pallet layers described below.

As shown in FIG. 5, a layer-based depalletization operation may include a depalletization of a plurality of pallet layers defined within a stack 500, wherein the plurality of pallet layers removed from the stack 500 during the layer-based depalletization operation is defined by a total pallet layer depalletization value stored at the depalletization system. For example, as illustrated, an exemplary depalletization system may execute a layer-based depalletization operation by fully depalletizing a first portion 512 of the plurality of objects defining a top pallet layer 522 and, further, upon determining that an updated depalletized layer value associated with the layer-based depalletization operation does not satisfy a total pallet layer depalletization value associated with the layer-based depalletization operation, fully depalletizing a second portion 514 of the plurality of objects defining a second pallet layer 524 of the stack 500. As a non-limiting example provided for illustrative purposes, in an exemplary circumstance wherein a depalletization system receives user input defining a first user selection of a layer-based depalletization mode and a second user selection defining a total pallet layer depalletization value of two (2), upon determining that depalletizing the first portion 512 of the plurality of objects defining the top pallet layer 522 of the stack 500 has been fully depalletized and updating the layer index data by increasing the depalletized layer value associated with the layer-based depalletization operation to a value of one (1), an exemplary depalletization system may compare the updated depalletized layer value of one (1) to the total pallet layer depalletization value of two (2) and determine that the total pallet layer depalletization value associated with the layer-based depalletization operation is not satisfied. Accordingly, as illustrated, exemplary depalletization system may proceed to fully depalletize the second portion 514 of the plurality of objects defining the second pallet layer 524 of the stack 500. In such an exemplary circumstance, upon determining that depalletizing the second portion 514 of the plurality of objects defining the second pallet layer 524 of the stack 500 has been fully depalletized, the exemplary depalletization system may update the layer index data associated with the layer-based depalletization operation by increasing the depalletized layer value from one (1) to an updated value of two (2). The exemplary depalletization system may compare the updated depalletized layer value of two (2) to the total pallet layer depalletization value of two (2) and determine that the total pallet layer depalletization value associated with the layer-based depalletization operation has been satisfied. As described herein, such a determination may cause the depalletization system to end the layer-based depalletization operation. Such an exemplary layer-based depalletization operation may embody a partial depalletization of the stack 500 wherein, upon execution thereof, the third pallet level 526 embodies the top pallet level defined by the plurality of objects of the stack 500.

Figure 6A:
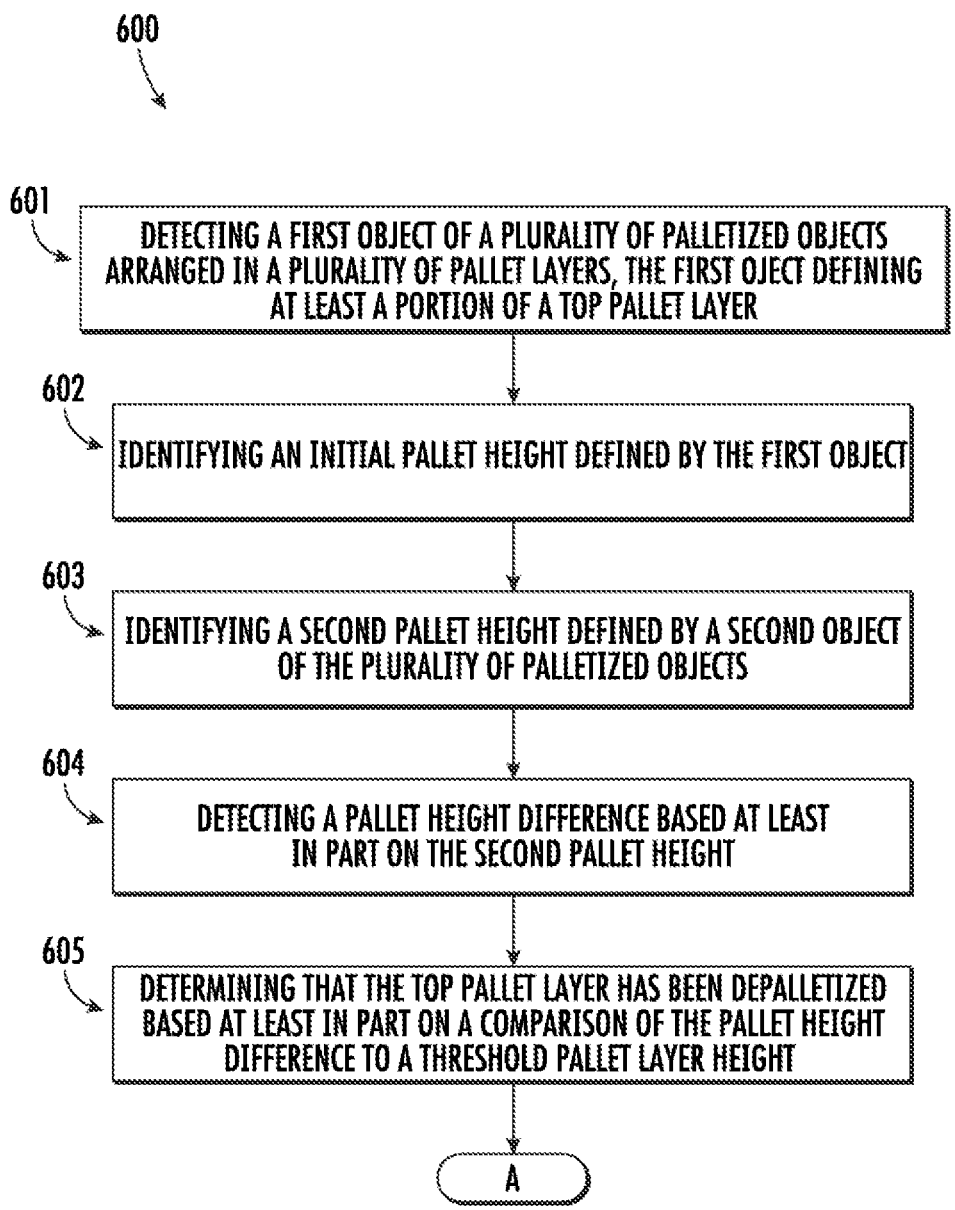
FIGS. 6A-6C are example flow diagrams illustrating example computer-implemented methods of layer-based depalletization in accordance with various embodiments of the present disclosure.
Figure 6B:
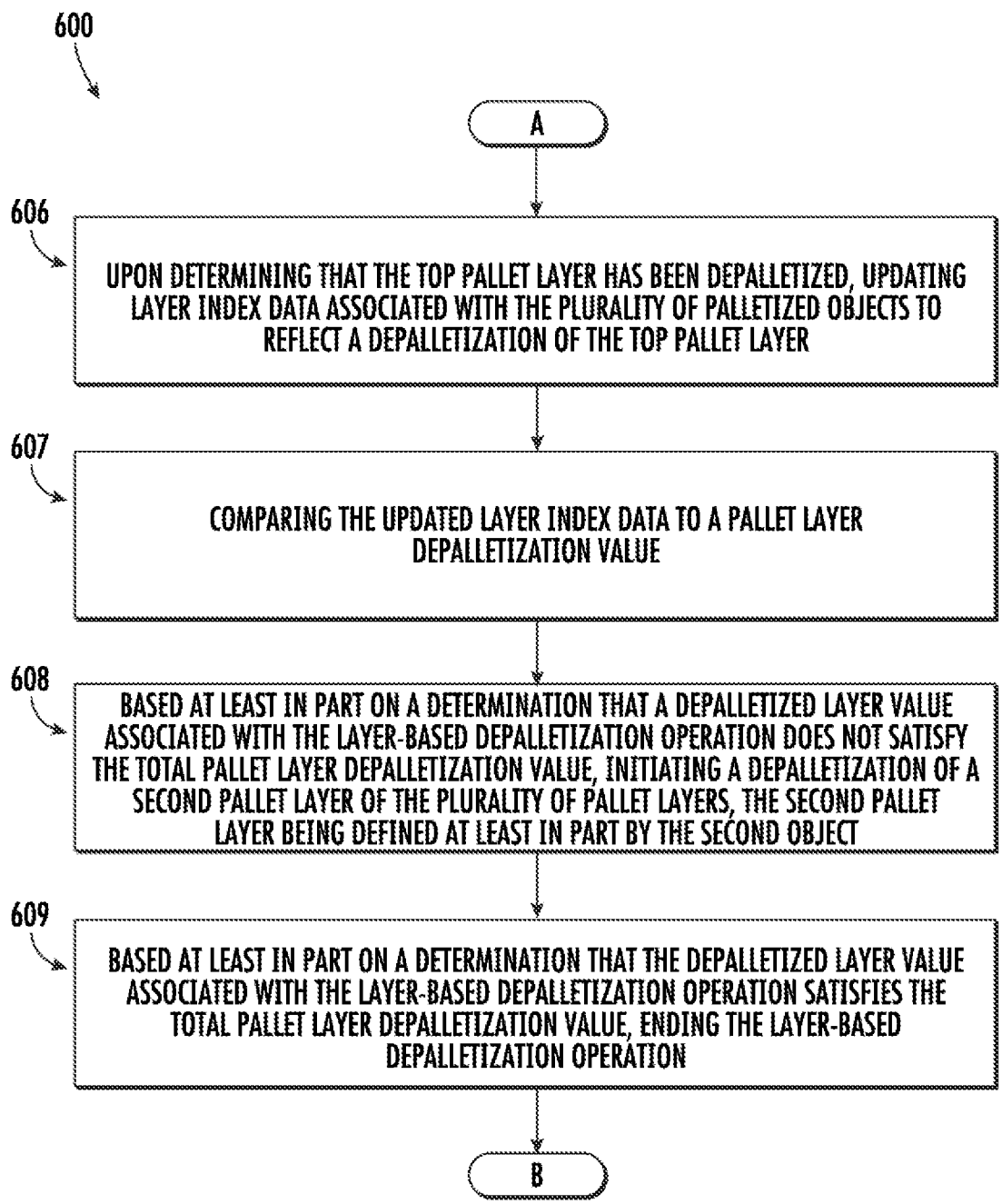
Figure 6C:
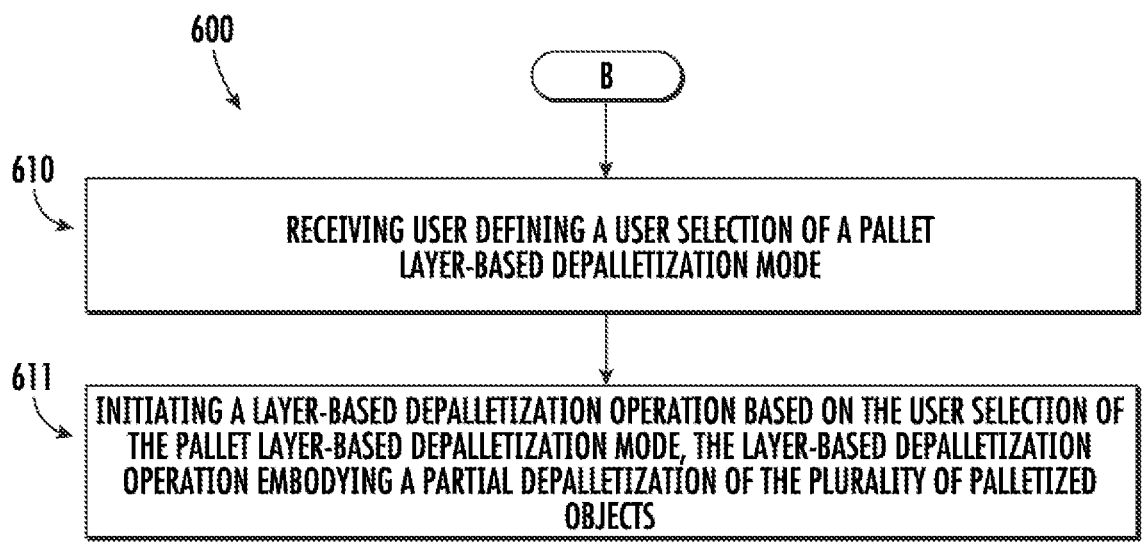

FIGS. 6A-6C are example flow diagrams illustrating example controller-implemented methods for robotic depalletization in accordance with various embodiments of the present disclosure. In various embodiments, these example flow diagrams illustrated in FIGS. 6A-6C for robotic depalletization 600 are performed in reference to the palletized objects shown in the various embodiments of at least FIGS. 4 and 5. In various embodiments, the steps in the example flow diagrams in FIGS. 6A-6C (e.g., 601, 602, 603, 604, 605) may be performed sequentially (e.g., step 602 before step 603), while in other embodiments the steps may occur simultaneously (e.g., step 602 occurring concurrently with step 603), or in any order necessary to achieve a desired outcome. In some aspects, the steps may be performed by individual subsystems of an exemplary system (e.g., one step to be performed by the execution subsystem 210 and another to be performed by the perception subsystem 202). In other aspects, the steps may be performed by a single subsystem, or by multiple subsystems acting in conjunction.

In at least one embodiment, the flow diagrams of FIGS. 6A-6C may be viewed in reference to FIGS. 4 and 5, and Applicant will reference FIGS. 4 and 5 in the following disclosure for example purposes. However, it may be understood that the flow diagrams of FIGS. 6A-6C can be viewed in reference to any suitable palletized diagrams. Also, according to some aspects, the flow diagrams of FIGS. 6A-6C can be viewed in reference to the systems disclosed in FIGS. 1A-3, and Applicant may refer to such systems in the following disclosure. However, it will also be understood that the flow diagrams of FIGS. 6A-6C can be viewed in reference to any suitable palletized systems.

In general, as described in greater detail with respect to FIGS. 6A-6C, an example depalletization method is provided for removing (e.g., depalletizing) a portion of the plurality of objects arranged in a stack defined by a plurality of pallet layers. For example, an example depalletization method may facilitate the partial depalletization of a plurality of palletized objects arranged in a stack such that only a portion of the plurality of objects are removed from the stack during a depalletization operation defined by the depalletization method. In particular, with respect to the flow diagrams shown in FIGS. 6A-6C, an example depalletization method is provided that facilitates the depalletization of a portion of the plurality of palletized objects arranged in the stack according to a layer-based depalletization operation.

As shown in at least FIG. 6A, in accordance with various aspects of the present disclosure, a controller-implemented method for robotic depalletization 600 is provided. In various embodiments, a step 601 of detecting a first object of a plurality of palletized objects arranged in a plurality of pallet layers, the first object defining at least a portion of a top pallet layer, is performed. In various embodiments, a step 602 of identifying an initial pallet height defined by the first object, is performed. In various embodiments, a step 603 of identifying a second pallet height defined by a second object of the plurality of palletized objects, is performed. In various embodiments, a step 604 of detecting a pallet height difference based at least in part on the second pallet height is performed. Further, In various embodiments, a step 605 of determining that the top pallet layer has been depalletized based at least in part on a comparison of the pallet height difference to a threshold pallet layer height is performed.

In various embodiments, determining that the top pallet layer has been depalletized may comprises determining that the pallet height difference between the initial object height defined by the first object and the second object height defined by the second object is greater than or equal to the threshold pallet layer height. For example, in various embodiments, the threshold pallet layer height may define a stored data value corresponding to an average, common, or otherwise applicable and predetermined pallet layer height value used as a comparative benchmark to determine whether a pallet height difference between a first object and a second object is sufficiently large to assume and/or determine that the first object and the second object are arranged in different pallet layers. In various embodiments, a determination that the pallet height difference between the initial object height defined by the first object and the second object height defined by the second object is less than the threshold pallet layer height may indicate that the second object and the first object are defined within in the same pallet layer. As described herein with respect to FIG. 4, upon determining that the pallet height difference between the initial object height defined by the first object and the second object height defined by the second object is less than the threshold pallet layer height, the above-referenced steps 601-604 may be at least partially repeated until it is determined that the each of the objects defining the top pallet later have been depalletized.

According to some aspects, and as shown in at least FIG. 6A, the flow chart of FIG. 6A may either terminate with point "A," or point "A" may represent a transition point for additional steps to be performed. According to some aspects, point "A" may lead into the steps shown in FIGS. 6B and 6C. However, it will be understood that, in some aspects, point "A" may indicate the end of the computer-implemented method for depalletization 600. It will be understood that point "B," as shown in FIGS. 6B and 6C, denotes similar functionality in at least some embodiments of the present disclosure. The various steps described herein may be performed in any order in which they are logically or physically capable of being performed.

As shown in FIG. 6B, in various embodiments, the computer implemented method 600 may include performing a step 606 of upon determining that the top pallet layer has been depalletized, updating layer index data associated with the plurality of palletized objects to reflect a depalletization of the top pallet layer. In various embodiments, updating the layer index data may comprise increasing the depalletized layer value associated with the layer-based depalletization operation. For example, the depalletized pallet layer value associated with the layer-based depalletization operation may correspond to the number of pallet layers that have been depalletized during the layer-based depalletization operation. The depalletized pallet layer value may be increased by a value of 1 as an indication that a pallet layer of the stack has been depalletized from the stack. Further, in various embodiments, the computer implemented method 600 may include performing a step 607 of comparing the updated layer index data to a total pallet layer depalletization value. In various embodiments, the total pallet layer depalletization value may be defined by user input received by a depalletization system, such as, for example, at a display defining a user interface in communication (e.g., wireless or wired) with a control subsystem of an exemplary depalletization system.

In various embodiments, the computer implemented method 600 may further include performing a step 608 of based at least in part on a determination that a depalletized layer value associated with a layer-based depalletization operation does not satisfy the total pallet layer depalletization value, initiating a depalletization of a second pallet layer of the plurality of pallet layers, the second pallet layer being defined at least in part by the second object. For example, the depalletized pallet layer value associated with the layer-based depalletization operation may not satisfy the total pallet layer depalletization value in an exemplary circumstance wherein the depalletized pallet layer value is less than the total pallet layer depalletization value.

In various embodiments, the computer implemented method 600 may include performing a step 609 of wherein updating the layer index data comprises increasing the depalletized layer value associated with the layer-based depalletization operation. For example, the layer-based depalletization operation may be ended based on a determination that the depalletized pallet layer value associated with the layer-based depalletization operation is equal to the total pallet layer depalletization value.

As shown in FIG. 6C, in various embodiments, the computer implemented method 600 may include performing a step 610 of receiving user input defining a user selection of a layer-based depalletization mode. For example, user input received by a depalletization system may be defined by a user interaction with a display and/or other interface that is in communication with the depalletization system and configured to receive a first user selection of a layer-based depalletization mode and a second user selection of a number of pallet layers to be depalletized as part of the layer-based depalletization operation initiated by the user (e.g., a total pallet layer depalletization value).

In various embodiments, the computer implemented method 600 may further include performing a step 611 of initiating a layer-based depalletization operation based on the user selection of the pallet layer-based depalletization mode, the layer-based depalletization operation embodying a partial depalletization of the plurality of palletized objects. In various embodiments, the user input may be further defined by a total pallet layer depalletization value corresponding to a user-selected number of pallet layers to be depalletized via layer-based depalletization operation.

Figure 7A:
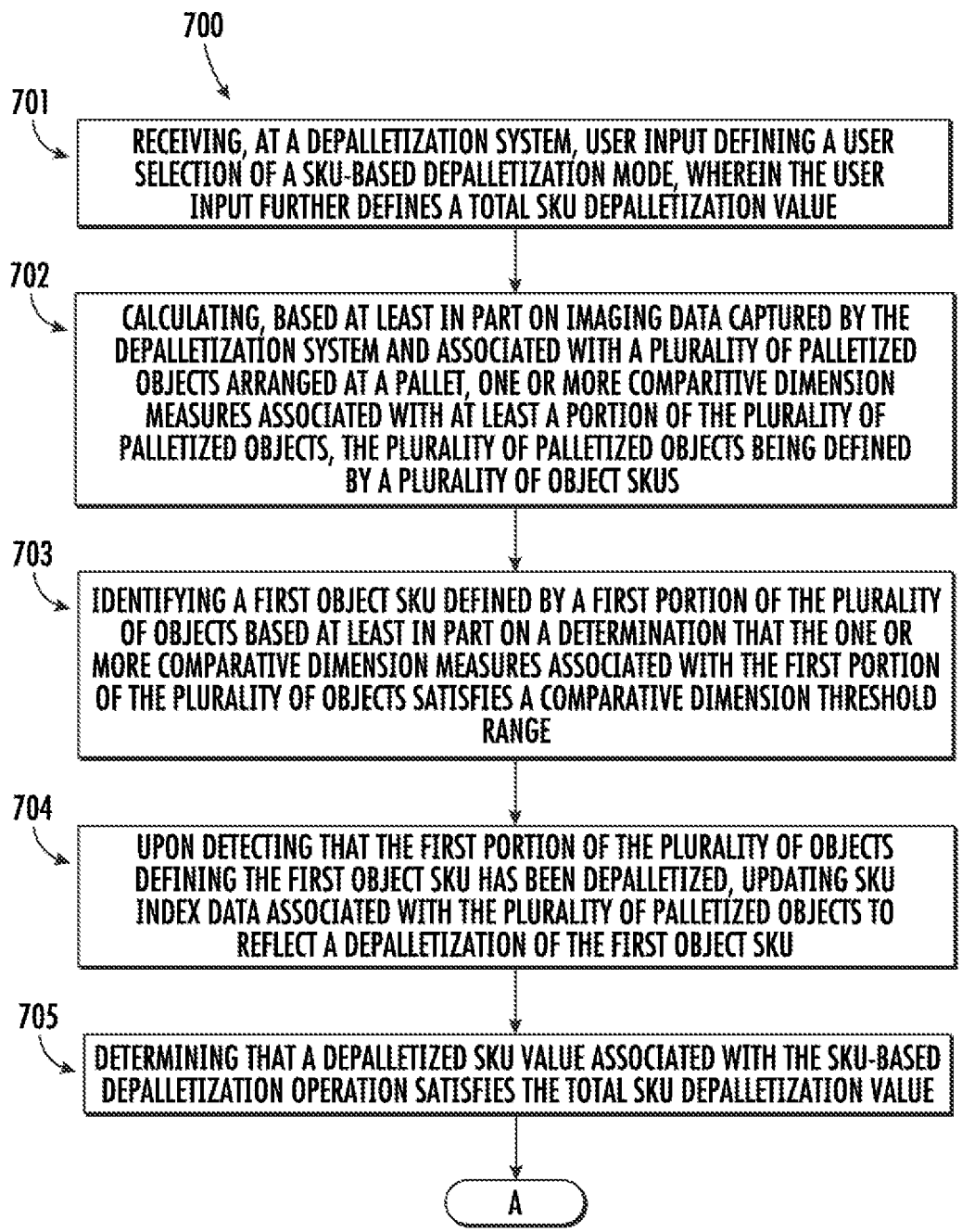
FIGS. 7A-7C are example flow diagrams illustrating example computer-implemented methods of SKU-based depalletization in accordance with various embodiments of the present disclosure.
Figure 7B:
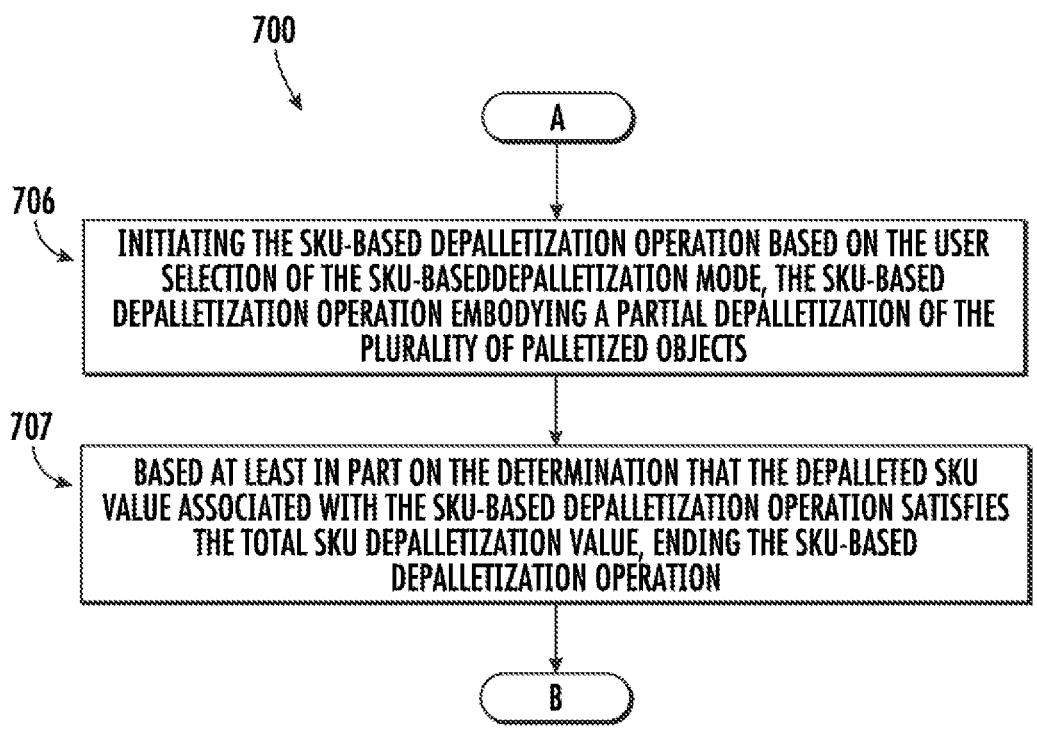
Figure 7C:
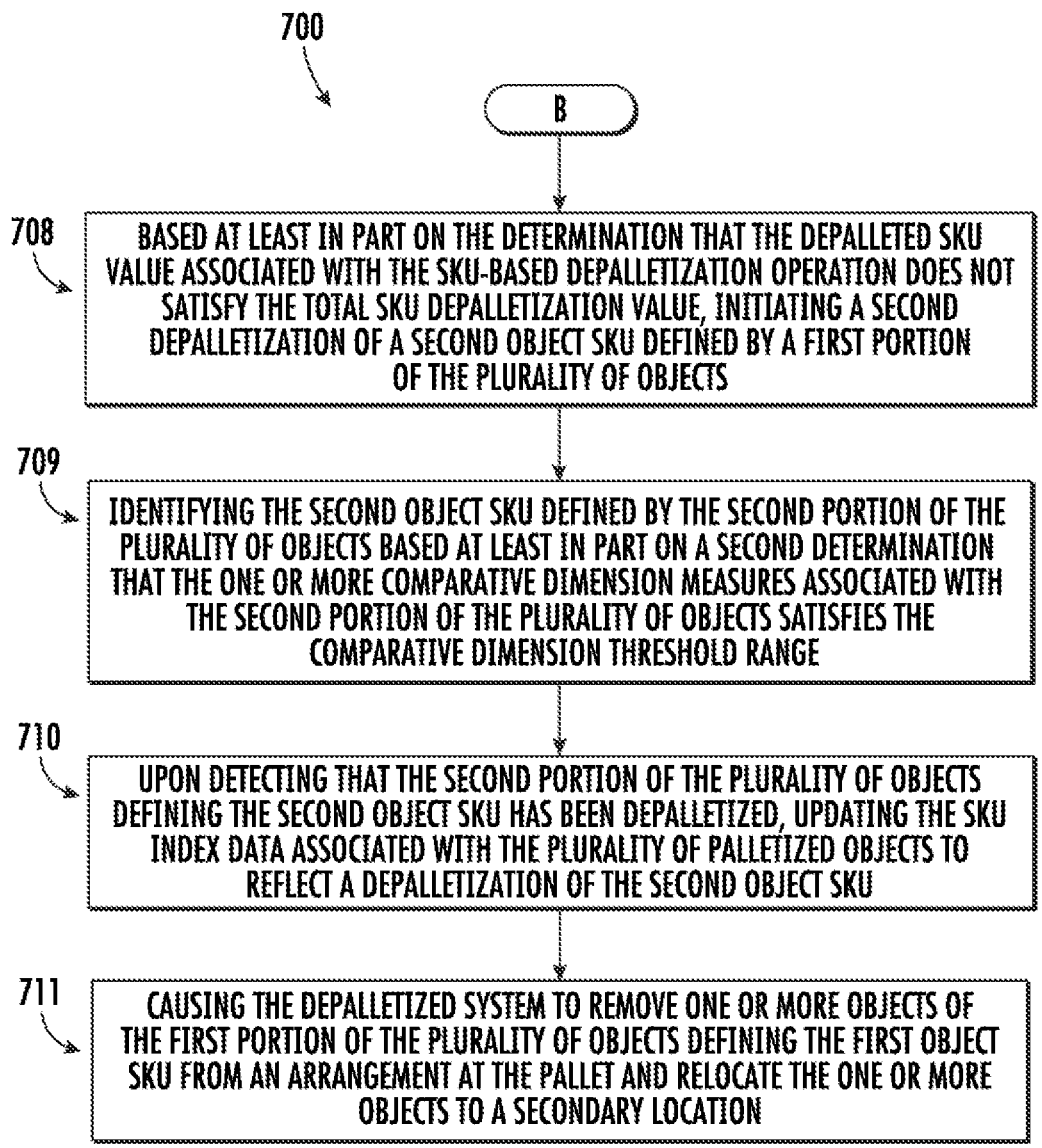

FIGS. 7A-7C are example flow diagrams illustrating example controller-implemented methods for robotic depalletization in accordance with various embodiments of the present disclosure. In various embodiments, these example flow diagrams illustrated in FIGS. 7A-7C for robotic depalletization 700 are performed in reference to the palletized objects shown in the various embodiments of at least FIG. 4. In various embodiments, the steps in the example flow diagrams in FIGS. 7A-7C (e.g., 701, 702, 703, 704, 705) may be performed sequentially (e.g., step 702 before step 703), while in other embodiments the steps may occur simultaneously (e.g., step 702 occurring concurrently with step 703), or in any order necessary to achieve a desired outcome. In some aspects, the steps may be performed by individual subsystems of an exemplary system (e.g., one step to be performed by the execution subsystem 210 and another step to be performed by the perception subsystem 202). In other aspects, the steps may be performed by a single subsystem, or by multiple subsystems acting in conjunction.

In at least one embodiment, the flow diagrams of FIGS. 7A-7C may be viewed in reference to FIGS. 4 and 5, and Applicant will reference FIGS. 4 and 5 in the following disclosure for example purposes. However, it may be understood that the flow diagrams of FIGS. 7A-7C can be viewed in reference to any suitable palletized diagrams. Also, according to some aspects, the flow diagrams of FIGS. 7A-7C can be viewed in reference to the systems disclosed in FIGS. 1A-3, and Applicant may refer to such systems in the following disclosure. However, it will also be understood that the flow diagrams of FIGS. 7A-7C can be viewed in reference to any suitable palletized systems.

In general, as described in greater detail with respect to FIGS. 7A-7C, an example depalletization method is provided for removing (e.g., depalletizing) a portion of the plurality of objects from a stack based on the portion of the plurality of objects defining one or more object SKUs. For example, an example depalletization method may facilitate the partial depalletization of a plurality of palletized objects arranged in a stack such that only a portion of the plurality of objects are removed from the stack during a depalletization operation defined by the depalletization method. In particular, with respect to the flow diagrams shown in FIGS. 7A-7C, an example depalletization method is provided that facilitates the depalletization of a portion of the plurality of palletized objects arranged in the stack according to a SKU-based depalletization operation. In some embodiments, the plurality of objects in the stack are of mixed, different stock keeping units (SKUs) such that the plurality of objects is defined by a plurality of object SKUs. The plurality of objects in a stack defining a plurality of different SKUs may indicate that the objects in the stack are of different types (e.g. having different sizes and/or shapes). As described herein, an example depalletization system may rely on vision system (such as a perception subsystem) to determine the size and/or the shape of the objects so that the depalletization system can depalletize the objects from the pallet (for example, calculate the pose of the depalletization system based at least in part on the size and/or the shape of the objects). In various embodiments, a partial depalletization of the plurality of objects in the stack may be executed (e.g., by a depalletization system) as a SKU-based depalletization operation, wherein a portion of the plurality of objects defined by one or more different object SKUs is removed from the stack and relocated to a secondary location, while a second portion of the plurality of objects remains palletized at the pallet.

As shown in at least FIG. 7A, in accordance with various aspects of the present disclosure, a controller-implemented method for robotic depalletization 700 is provided. In various embodiments, a step 701 of receiving, at a depalletization system, user input defining a user selection of a SKU-based depalletization mode, wherein the user input further defines a total SKU depalletization value. For example, user input received by a depalletization system may be defined by a user interaction with a display and/or other interface that is in communication with the depalletization system and configured to receive a first user selection of a SKU-based depalletization mode and a second user selection of a number of object-SKUs to be depalletized as part of the SKU-based depalletization operation initiated by the user (e.g., a total SKU depalletization value).

In various embodiments, a step 702 of calculating, based at least in part on imaging data captured by the depalletization system and associated with a plurality of palletized objects arranged at a pallet, one or more comparative dimension measures associated with at least a portion of the plurality of palletized objects, the plurality of palletized objects being defined by a plurality of object SKUs, is performed. In various embodiments, imaging data captured by a depalletization system (e.g., a perception subsystem) and associated with a plurality of objects disposed on a pallet a processing element (such as, but not limited to, the processing element 305 of the control subsystem 218 of an example depalletization system described above in connection with at least FIG. 1A to FIG. 3) may be received (e.g., by a processing element of the depalletization system). For example, imaging data may be a 2-D image data that is captured by a 2-D image capturing device of the perception subsystem (similar to those described above in connection with at least FIG. 1A). Additionally, or alternatively, the imaging data may be a 3-D image data that is captured by a 3-D image capturing device of the perception subsystem (similar to those described above in connection with at least FIG. 1A). In some embodiments, the 2-D image capturing device and/or the 3-D image capturing device may be positioned on top of the pallet, and the first imaging data may provide a view of a top, visible pallet layer of a pallet that comprises objects to be depalletized. In various embodiments, the imaging data may define point cloud-based data associated with one or more of the plurality of objects.

In some embodiments, based on the imaging data, a processing element of a depalletization system may calculate a number of pixels the length, width, and/or height of each object (for example, in the 2-D image and/or in the 3-D image). To calculate a comparative dimension measure between two objects, the depalletization system (e.g., the processing element) may calculate a difference between the pixel number of the length of one object and the pixel number of the length of another object, calculate a difference between the pixel number of the width of one object and the pixel number of the width of another object, and/or calculate a difference between the pixel number of the height of one object and the pixel number of the height of another object. In some embodiments, the processing element may calculate comparative dimension measures between various objects arranged at the same pallet layer.

In various embodiments, a step 703 of identifying a first object SKU defined by a first portion of the plurality of objects based at least in part on a determination that the one or more comparative dimension measures associated with the first portion of the plurality of objects satisfies a comparative dimension threshold range, is performed. For example, a first portion of the plurality of objects may be identified as a first object SKU based at least in part on a determination that each of the objects in the first portion is of an at least substantially similar size, shape, and/or configuration such that that one or more comparative dimension measures associated with each of the first portion of objects is within the comparative dimension threshold range.

In various embodiments, a step 704 of, upon detecting that the first portion of the plurality of objects defining the first object SKU has been depalletized, updating SKU index data associated with the plurality of palletized objects to reflect a depalletization of the first object SKU is performed. In various embodiments, updating the SKU index data associated with the plurality of palletized objects to reflect the depalletization of the first object SKU may comprise increasing the depalletized SKU value associated with the SKU-based depalletization operation. For example, the depalletized SKU value associated with the SKU-based depalletization operation may correspond to the number of object SKUs that have been depalletized during the SKU-based depalletization operation. The depalletized SKU value associated with the SKU-based depalletization operation may be increased by a value of 1 as an indication that a portion of the plurality of objects defining one object SKU has been depalletized from the stack. Further, In various embodiments, a step 705 of determining that a depalletized SKU value associated with the SKU-based depalletization operation satisfies the total SKU depalletization value is performed. In various embodiments, the total depalletized SKU value associated with a SKU-based depalletization operation may be defined the number of object SKUs that are to be depalletized during the SKU-based depalletization operation. As described herein, the total depalletized SKU value may be established based on user input received by the depalletization device.

According to some aspects, and as shown in at least FIG. 7A, the flow chart of FIG. 7A may either terminate with point "A," or point "A" may represent a transition point for additional steps to be performed. According to some aspects, point "A" may lead into the steps shown in FIGS. 7B and 7C. However, it will be understood that, in some aspects, point "A" may indicate the end of the computer-implemented method for depalletization 600. It will be understood that point "B," as shown in FIGS. 7B and 7C, denotes similar functionality in at least some embodiments of the present disclosure. The various steps described herein may be performed in any order in which they are logically or physically capable of being performed.

As shown in FIG. 7B, in various embodiments, the computer implemented method 700 may include performing a step 706 of initiating the SKU-based depalletization operation based on the user selection of the SKU-based depalletization mode, the SKU-based depalletization operation embodying a partial depalletization of the plurality of palletized objects. In various embodiments, a processing element of an exemplary depalletization system (such as, but not limited to, the processing element 305 of the control subsystem 218 of an example depalletization system described above in connection with at least FIG. 1A to FIG. 3) may cause an execution subsystem associated with the depalletization system to operate in a SKU-depalletization mode in response to user input received by the depalletization system embodying a user selection of the SKU-based depalletization mode. Further, in various embodiments, the computer implemented method 700 may include performing a step 707 of based at least in part on the determination that the depalletized SKU value associated with the SKU-based depalletization operation satisfies the total SKU depalletization value, ending the SKU-based depalletization operation. For example, the SKU-based depalletization operation may be ended based on a determination that the depalletized SKU value associated with the SKU-based depalletization operation is equal to the total SKU depalletization value.

As shown in FIG. 7C, in various embodiments, the computer implemented method 700 may further include performing a step 708 of based at least in part on a determination that the depalletized SKU value associated with the SKU-based depalletization operation does not satisfy the total SKU depalletization value, initiating a second depalletization of a second object SKU defined by a first portion of the plurality of objects. For example, the depalletized SKU value associated with the SKU-based depalletization operation may not satisfy the total SKU depalletization value in an exemplary circumstance wherein the depalletized SKU value is less than the total SKU depalletization value. In various embodiments, the computer implemented method 700 may include performing a step 709 of identifying the second object SKU defined by the second portion of the plurality of objects based at least in part on a second determination that the one or more comparative dimension measures associated with the second portion of the plurality of objects satisfies the comparative dimension threshold range. In various embodiments, the computer implemented method 700 may include performing a step 710 of upon detecting that the second portion of the plurality of objects defining the second object SKU has been depalletized, updating the SKU index data associated with the plurality of palletized objects to reflect a depalletization of the second object SKU. In various embodiments, the computer implemented method 700 may further include performing a step 711 of causing the depalletization system to remove one or more objects of the first portion of the plurality of objects defining the first object SKU from an arrangement at the pallet and relocate the one or more objects to a secondary location.

Figure 8:
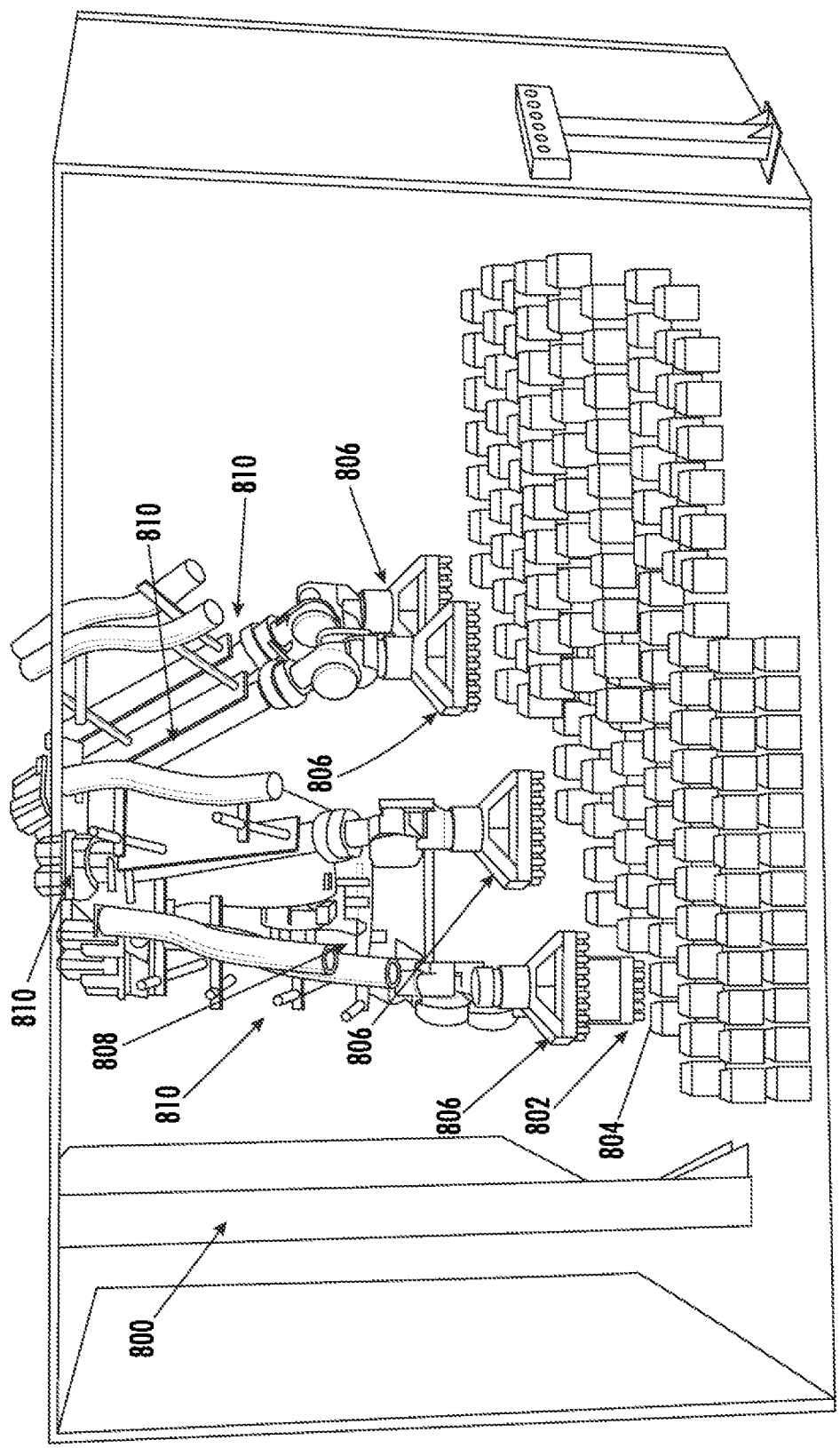
FIG. 8 illustrates an example three-dimensional representation of electronic data points showing an example depalletization system and an example surrounding environment in accordance with various embodiments of the present disclosure.

FIG. 8 is an example three-dimensional representation of electronic data points showing an example depalletization system as a set of electronic data points 800 and an example surrounding environment in accordance with various aspects of the present disclosure. As shown in FIG. 8, according to some aspects, a plurality of palletized objects may be represented as an object set of electronic data points 802. According to some aspects, this set may include at least one of a first object electronic data point 804, and the end effector (e.g., the end effector 113 of robotic arm 115) as an end effector set of electronic data points 806. According to some aspect, the vertical removal of the least one first object electronic data point 804 may be removed from the object set of electronic data points 802 by means of the end effector set of electronic data points 806. In various embodiments, an object set of electronic data points described herein may be voxels. It will be understood that voxels represent a value in three-dimensional space, analogous to how pixels represent values in a two-dimensional space. It will be understood that, in various embodiments, the set of electronic data points described herein may be pixels. According to some aspects, voxels may efficiently represent objects for depalletization and may aid in visualization during the execution of an exemplary depalletization operation.

Further, in various embodiments, the robotic system (e.g., the system 100A) may be represented as a set of robotic data points 808. According to some aspects, and as shown in FIG. 8, there may be multiple end effector sets of electronic data points 806. According to some aspects, the robotic arm (e.g., robotic arm 115 of system 100A) may be represented as a robotic arm set of electronic data points 810, which may comprise the end effector set of electronic data points 806. According to some aspects, there may be multiple robotic arm sets of electronic data points 810 for the robotic electronic data points 808.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A controller-implemented method for robotic depalletization, the method comprising: detecting a first object of a plurality of palletized objects arranged in a plurality of pallet layers, the first object defining at least a portion of a top pallet layer; identifying an initial pallet height defined by the first object; identifying a second pallet height defined by a second object of the plurality of palletized objects; detecting a pallet height difference based on a difference between the initial pallet height of the first object and the second pallet height of the second object; comparing the detected pallet height difference with a threshold pallet layer height; determining that the top pallet layer has been depalletized when the pallet height difference is greater than or equal to the threshold pallet layer height; and causing depalletization of at least the first object or the second object from the top pallet layer and relocating at least one of the first object or the second object to a secondary location based on determining that the pallet height difference is less than the threshold pallet layer height.

2. The controller-implemented method of claim 1, further comprising, upon determining that the top pallet layer has been depalletized, updating layer index data associated with the plurality of palletized objects to reflect a depalletization of the top pallet layer.

3. The controller-implemented method of claim 2, further comprising comparing an updated layer index data to a total pallet layer depalletization value.

4. The controller-implemented method of claim 3, further comprising, based at least in part on a determination that a depalletized layer value associated with a layer-based depalletization operation does not satisfy the total pallet layer depalletization value, initiating a depalletization of a second pallet layer of the plurality of pallet layers, the second pallet layer being defined at least in part by the second object.

5. The controller-implemented method of claim 4, wherein updating the layer index data comprises increasing a depalletized layer value associated with a layer-based depalletization operation.

6. The controller-implemented method of claim 4, further comprising, based at least in part on a determination that the depalletized layer value associated with the layer-based depalletization operation satisfies the total pallet layer depalletization value, ending the layer-based depalletization operation.

7. The controller-implemented method of claim 3, wherein the total pallet layer depalletization value is defined by user input received by a depalletization system.

8. The controller-implemented method of claim 1, further comprising: receiving user input defining a user selection of a pallet layer-based depalletization mode; and initiating a layer-based depalletization operation based on the user selection of the pallet layer-based depalletization mode, the layer-based depalletization operation embodying a partial depalletization of the plurality of palletized objects.

9. The controller-implemented method of claim 8, wherein the user input is further defined by a total pallet layer depalletization value corresponding to a user-selected number of pallet layers to be depalletized via layer-based depalletization operation.

10. The controller-implemented method of claim 1, wherein the second pallet height is detected based at least in part on imaging data captured by a depalletization system.

11. An apparatus comprising at least one processor and at least one non-transitory memory comprising a computer program code, the at least one non-transitory memory and the computer program code configured to, with the at least one processor, cause the apparatus to: detect a first object of a plurality of palletized objects arranged in a plurality of pallet layers, the first object defining at least a portion of a top pallet layer; identify an initial pallet height defined by the first object; identify a second pallet height defined by a second object of the plurality of palletized objects; detect a pallet height difference based on a difference between the initial pallet height of the first object and the second pallet height of the second object; comparing the detected pallet height difference with a threshold pallet layer height; determine that the top pallet layer has been depalletized when the pallet height difference is greater than or equal to the threshold pallet layer height; and cause depalletization of at least the first object or the second object from the top pallet layer and relocate at least one of the first object or the second object to a secondary location based on determining that the pallet height difference is less than the threshold pallet layer height.

* * * * *